US011626234B2

(12) United States Patent
Waeckerle et al.

(10) Patent No.: US 11,626,234 B2
(45) Date of Patent: Apr. 11, 2023

(54) TRANSFORMER CORE FOR A CUT-AND-STACK TYPE TRANSFORMER AND TRANSFORMER INCLUDING SAME

(71) Applicant: APERAM, Luxembourg (LU)

(72) Inventors: Thierry Waeckerle, Nevers (FR); Olivier Hubert, Agnetz (FR)

(73) Assignee: APERAM, Luxembourg (LU)

( * ) Notice: Subject to any disclaimer, the term of this patent is extended or adjusted under 35 U.S.C. 154(b) by 959 days.

(21) Appl. No.: 16/338,060

(22) PCT Filed: Sep. 30, 2016

(86) PCT No.: PCT/IB2016/001409
§ 371 (c)(1),
(2) Date: Mar. 29, 2019

(87) PCT Pub. No.: WO2018/109509
PCT Pub. Date: Jun. 21, 2018

(65) Prior Publication Data
US 2020/0027641 A1 Jan. 23, 2020

(51) Int. Cl.
*H01F 27/245* (2006.01)
*H01F 1/147* (2006.01)
(Continued)

(52) U.S. Cl.
CPC ............ *H01F 27/245* (2013.01); *C21D 8/12* (2013.01); *C22C 38/08* (2013.01);
(Continued)

(58) Field of Classification Search
None
See application file for complete search history.

(56) References Cited

U.S. PATENT DOCUMENTS 2,112,084 A 3/1938 Frey et al.
2,569,468 A 10/1951 Gaugler
(Continued)

FOREIGN PATENT DOCUMENTS

WO WO 2016/083866 6/2016

OTHER PUBLICATIONS

International Search Report, PCT/IB2016/001409, dated Apr. 18, 2017.

*Primary Examiner* — Xiaowei Su
(74) *Attorney, Agent, or Firm* — Nixon & Vanderhye

(57) ABSTRACT

A transformer core includes two stacks, each of first thickness with ≥1 flat parts, the cutting directions rectilinear and parallel or perpendicular to one another, the stacks facing across a gap, the flat parts made of an austenitic FeNi alloy 30-80% Ni and 10% alloying elements, with a sharp {100} <001> cubic texture, the cutting directions of the flat parts parallel to the rolling or transverse direction, the flat parts having magnetic losses, for a maximum induction of 1 T, <20 W/kg at 400 Hz, producing apparent magnetostriction for maximum induction values and field directions as follows: 1.2 T<5 ppm, large side of the sample parallel to rolling direction; 1.2 T<5 ppm, large side of the sample parallel to transverse direction in the rolling plane; and 1.2 T<10 ppm, length direction parallel to intermediate direction 45° to rolling and transverse directions.

20 Claims, 5 Drawing Sheets

(51) Int. Cl.
*C21D 8/12* (2006.01)
*C22C 38/08* (2006.01)
*H01F 1/18* (2006.01)
*H01F 3/02* (2006.01)
*H01F 3/14* (2006.01)
*H02K 1/02* (2006.01)

(52) U.S. Cl.
CPC ........... *H01F 1/14716* (2013.01); *H01F 1/18* (2013.01); *H01F 3/02* (2013.01); *H01F 3/14* (2013.01); *H02K 1/02* (2013.01)

(56) References Cited

U.S. PATENT DOCUMENTS

| | | |
|---|---|---|
| 3,297,434 A | 1/1967 | Littmann et al. |
| 4,290,827 A | 9/1981 | Pfeifer et al. |
| 2004/0212269 A1 | 10/2004 | Decristofaro |
| 2017/0345554 A1* | 11/2017 | Waeckerle .............. H01F 27/25 |

* cited by examiner

TRANSFORMER CORE FOR A CUT-AND-STACK TYPE TRANSFORMER AND TRANSFORMER INCLUDING SAME

The invention relates to the field of electrical transformers that can be carried on board aircraft. Their function is the galvanic isolation between the source network and the on-board electrical and electronic systems, as well as the transformation of voltage between the primary circuit (power supply side of the generator(s) on board) and one or several secondary circuits. Moreover these transformers may be "rectifiers" by a downstream function based on electronic components, in order to deliver a constant voltage to certain aircraft devices.

Low-frequency on-board transformers (≤1 kHz) consist mainly of a soft magnetic alloy core, laminated, stacked or wound according to construction constraints, and primary and secondary windings of copper. The primary supply currents are variable over time, periodic but not necessarily purely sinusoidal, which does not fundamentally change the needs of the transformer.

The constraints on these transformers are multiple.

They must have a volume and/or a weight (in general the two are closely connected) that is as small as possible in order to provide a density of volume or weight power that is as high as possible. The lower the operating frequency, the greater is the section and the volume of the magnetic yoke (thus also the weight) of this yoke, which exacerbates the need for miniaturization in low frequency applications. Since the fundamental frequency is very often imposed, this amounts to obtaining the highest possible working magnetic flux or, if the electric power delivered is imposed, to reduce as far as possible the section of the passage of the magnetic flux (and therefore the weight of materials), always with the aim of increasing the power-to-weight ratio by reducing the weight on board.

They must have sufficient longevity (at least 10 to 20 years depending on the application) to make them cost-effective. Therefore, the thermal operating regime must be taken into account with respect to the aging of the transformer. Typically a minimum life of 100,000 h at 200° C. is desired.

The transformer must operate on a roughly sinusoidal frequency power supply network, with an amplitude of the output voltage that may vary transiently by up to 60% from one moment to the next, and, in particular, when the transformer is energized or when an electromagnetic actuator is suddenly switched on. This has the consequence, and by construction, a current draw to the primary of the transformer through the nonlinear magnetization curve of the magnetic core. The elements of the transformer (insulators and electronic components) must be able to withstand large variations of this drawn current, the so-called "inrush effect", without damage.

This inrush effect may be quantified by an "inrush index" In, which is calculated by the formula $In = 2 \cdot B_t + B_r - B_{sat}$, where $B_t$ is the nominal work induction of the magnetic core of the transformer, $B_{sat}$ is the saturation induction of the core, and $B_r$ is its remanent induction.

It is important to specify that the inrush translates the possibility that the transformer is suddenly subject (for example during the start-up of the transformer when the onboard system is already generating its electric power) to a violent voltage draw corresponding to the nominal magnetic flux variation $d\phi/dt$ for which it is designed. If at this moment the magnetic flux in the transformer is initially $\phi_0$, then the magnetic flux is abruptly brought to $\phi_0 + d\phi$. If $\phi_0$ is close to 0, then $\phi_0 + d\phi$ is close to $d\phi$, which may be close to a saturation flux if the transformer has been dimensioned accordingly. But if $\phi_0$ is high, for example near the elbow of the curve B(H), then the addition of a flux $d\phi$ will bring it to a very high value $\phi_0 + d\phi$, and therefore to a hypersaturated magnetic induction in order to generate this additional flow $d\phi$. To do this, the transformer will therefore use an applied hypersaturating magnetic field, and a corresponding current to the primary of the transformer that will cause a sudden rise in current in the power electronics board, which may cause significant damage.

Also, in order to avoid being in such a situation of hypersaturating $\phi_0 + d\phi$, and since it is impossible to predict whether $\phi_0$ will be low or high at the time of the transformer connection, those skilled in the art of transformers apply, in particular, the following rules integrated into the inrush formula above:

A first rule is to increase the saturation induction of the material in order to accept the maximum magnetic flux during the electrical connection of the transformer;

A second rule is to reduce the remanent induction $B_r$ in order to reduce $\phi_0$.

By remanent induction $B_r$, here, as in the rest of the text, is meant the induction point at which the magnetic field is canceled on the major hysteresis cycle. In fact, as we do not know a priori the magnetic history of the transformer (and this is the general case of an onboard transformer operation), it is impossible to know whether the transformer—whether it is at rest or in that electrical state before it is connected to the on-board electrical network—has previously gone through a major hysteresis cycle (in which case it will be at rest at maximum $B_r$ induction, which is simply called $B_r$) under the effect of a transient current spike, or whether it has traveled a minor hysteresis cycle (i.e. inside the major cycle in that the magnetic core has not been brought to saturation induction by the maximum field applied. As a precaution in view of this uncertainty; we can not consider the induction $B_r$ of the major hysteresis cycle as a characteristic quantity with respect to the inrush phenomenon.

It is noted that in magnetism, the "major" and "minor" hysteresis cycles are conventionally defined as follows.

A hysteresis cycle, in magnetization M under a variable applied field H, is the closed curve M(H) obtained by varying H between 2 values Hmin and Hmax until the corresponding magnetizations M(Hmin) and M(Hmax) are stabilized; then the loop M(H) is closed. The hysteresis is characterized by the fact that the magnetization M is different—in whole or in part—between the forward path (Hmin→Hmax) called the "ascending hysteresis curve" and the return path (Hmax→Hmin) called the "descending hysteresis curve". It can be seen that the hysteresis thus forms a loop with its two ascending and descending parts, and that these two parts join together for two fields of "closing" of the ring Hferm1 and Hferm2.

By increasing the applied extreme fields Hmin and Hmax, one realizes that the hysteresis cycle ends up narrowing to form a single magnetization curve at the highest magnetic fields: the field from which one goes from two to one curve is the so-called "closing" field Hferm1 or Hferm2.

If Hmax>Hferm2 and Hmin<Hferm (i.e. if the hysteresis loop transforms into a single magnetization curve at both ends for the highest applied fields) then the hysteresis cycle is called "major". Otherwise it is called "minor".

A third rule consists of reducing the nominal work induction $B_t$, which amounts to having the magnetic core of the transformer describe a minor hysteresis cycle whose maximum value is by definition $B_t$.

In order to limit the inrush effect, the most widely used and safest method for the most common uses of low frequency transformers is to reduce $B_t$ (see formula above), in order to reduce the flux increase de (which is worth $2 \cdot B_r \cdot$section of the core) that will have to temporarily enter the transformer during its electrical connection, for example.

On the other hand, reducing $B_r$ also amounts to reducing the electrical transformation capacity of the voltage of the transformer in steady state (the main task of the transformer), which must be compensated by increasing the magnetic yoke section (voltage=$d\phi/dt=d(N \cdot B_t \cdot S)/dt$, where N=number of turns in the secondary), thus by increasing its weight, which is not a satisfactory solution for an onboard transformer. In this case, we will always prefer to limit the inrush by means of solutions based on a choice of magnetic materials to increase $B_s$ and reduce $B_r$ in order to limit the lowering of $B_t$.

The noise emitted by the transformer due to electromagnetic forces and magnetostriction must be low enough to comply with the standards in force or to meet the requirements of users and personnel near the transformer, increasingly, pilots and co-pilots want to be able to communicate directly without headsets.

The thermal efficiency of the transformer is also very important to consider, since this sets both its internal operating temperature and the heat flows that must be discharged, for example by means of an oil bath surrounding the windings and the yoke, associated with oil pumps dimensioned accordingly. The thermal power sources are mainly Joule losses from primary and secondary windings, and magnetic losses from magnetic flux variations over time and in the magnetic material. In industrial practice, the volume thermal power to be extracted is limited to a certain threshold imposed by the size and power of the oil pumps, and the internal operating limit temperature of the transformer.

Finally, the cost of the transformer must be kept as low as possible in order to ensure the best technical-economic compromise between cost of materials, design, manufacturing and maintenance, and optimization of the electrical power density (weight or volume) of the device, by taking into account the thermal regime of the transformer.

In general, it is advantageous to look for the highest density of weight/volume power possible. The criteria to be considered in order to increase it are mainly saturation magnetization Js and magnetic induction at 800 A/m $B_{800}$ for medium high permeability materials such as iron, iron-silicon, iron-cobalt alloys, or magnetic induction at 80 A/m $B_{80}$ for high permeability magnetic materials such as Fe—Ni alloys.

Two technologies for manufacturing low-frequency onboard transformers are currently used.

According to a first of these technologies, the transformer comprises a wound magnetic circuit when the power supply is single-phase. When the power supply is three-phase, the structure of the core of the transformer is in the form of two contiguous toric cares of the preceding type, and surrounded by a third wound torus to form an "eight" around the two previous toric cores. In practice, this form of circuit imposes a small thickness on the magnetic plate (typically 0.1 mm). In fact, this technology is only used when the supply frequency constrains, taking into account the currents induced, the use of strips of this thickness, i.e. typically for frequencies of a few hundred Hz.

According to the second of these technologies, a stacked magnetic circuit is used, regardless of the thicknesses of the magnetic plates envisaged. This technology is therefore valid for any frequency below a few kHz. However, special care must be taken in deburring, juxtaposing or even electrical insulation of the plates, in order to reduce both the parasitic air gaps (and thus optimize the apparent power) and to limit the currents induced between the plates.

In either of these technologies, a soft magnetic material with high permeability is used in onboard power transformers, whatever the strip thickness envisaged. Two families of these materials exist in thicknesses of 0.35 mm to 0.1 mm, or even 0.05 mm, and are clearly distinguished by their chemical compositions:

Fe-3% Si alloys (the compositions of the alloys are given in % by weight throughout the text, with the exception of that of the nanocrystalline alloys which will be discussed later), whose fragility and electrical resistivity are mainly controlled by the Si content; wherein their magnetic losses are quite low (N.O. non-oriented grain alloys) to low (G.O. grain oriented alloys), their saturation magnetization Js is high (of the order of 2 T), their cost is very moderate; there are two sub-families of Fe-3% Si that are used either for an onboard transformer core technology or the like:

Fe-3% Si with Oriented Grains (G.O.), used for "wound" type onboard transformer structures: wherein their high permeability ($B_{800}$=1.8-1.9 T) is due to their highly present texture {110} <001>; wherein these alloys have the advantage of being inexpensive, easy to form, of high permeability, but their saturation is limited to 2 T, and they have a very marked non-linearity of the magnetization curve which can cause very important harmonics;

Non-Oriented (N.O.) Grain Fe-3% Si, used for "cut-and-stack" type onboard transformer structures; wherein their permeability is reduced, and their saturation magnetization is similar to that of G.O;

Fe-48% Co-2% V alloys, whose brittleness and electrical resistivity are mainly controlled by vanadium; they owe their high magnetic permeabilities not only to their physical characteristics (low K1) but also to the cooling after final annealing which sets K1 at a very low value; because of their fragility, these alloys must be shaped in the hardened state (by cutting, stamping, folding . . . ), and only when the piece has its final shape (rotor or stator of a rotating machine, in the form of an E or I transformer) is the material then annealed in the final step; moreover, because of the presence of V, the quality of the annealing atmosphere must be perfectly controlled to avoid becoming oxidizing; finally the price of this material, which is very high (20 to 50 times that of Fe-3% Si—G.O.), is related to the presence of Co and is roughly proportional to the content of Co.

Only these two families of high permeability materials are currently used in onboard low frequency power transformers. However, it has long been known that the addition of Co to iron increases the magnetic saturation of the alloy, reaching 2.4 T towards 35 to 50% Co, and one could have expected to see the use of other FeCo-based materials that contain less cobalt than Fe-48% Co-2% V in onboard transformers.

Unfortunately, it turns out that these intermediate alloys have a magnetocrystalline anisotropy of several tens of kJ/m$^3$, which does not allow them to offer high permeability in the case of a random distribution of the final crystallographic orientations. In the case of magnetic plates less than 48% Co for medium-frequency on-board transformers, it has long been known that the chances of success necessarily pass through an acute texture characterized by the fact that in each grain, an axis <100> is very close to the rolling direction. The texture {110} <001> obtained by Goss in Fe 3% Si by secondary recrystallization is an illustrative case. However, according to these works, the plate should not contain cobalt.

More recently, it has been shown in U.S. Pat. No. 3,881, 967 that with additions of 4 to 6% Co and 1 to 1.5% Si, and also by using secondary recrystallization, high permeabilities could also be obtained: $B_{800}$=1.98 T, a gain of 0.02 Ti % Co at 800 A/m compared to the best current plates Fe 3% Si G.O. ($B_{800}$≈1.90 T). It is obvious, however, that an increase of only 4% of the $B_{800}$ is not enough to significantly lighten a transformer. By way of comparison, an optimized Fe-48% Co-2% V alloy for transformers has a $B_{800}$ of approximately 2.15 T±0.05 T, which allows an increase in magnetic flux for the same yoke section, from about 13%±3% at 800 A/m, from about 15% at 2500 A/m, from about 16% at 5000 A/m.

It should also be noted the presence in Fe 3% Si G.O. of large grains due to secondary recrystallization, and of a very low disorientation between crystals allowing a $B_{800}$ of 1.9 T, coupled to the presence of a magnetostriction coefficient $\lambda_{100}$ very clearly greater than 0. This makes this material very sensitive to mounting and operating constraints, which brings the $B_{800}$ of a Fe 3% Si G.O. into industrial practice in operation in an on-board transformer at about 1.8 T. This is also the case for the alloys of U.S. Pat. No. 3,881,967. Furthermore, Fe-48% Co-2% V has magnetostriction coefficients of amplitude that are still 4 to 5 times higher than Fe-3% Si, but a random distribution of crystallographic orientations and a small average grain size (a few tens of microns), which makes it much less sensitive to low stresses, and therefore does not significantly decrease the $B_{800}$ in operation.

In operation, it must therefore be considered that the replacement of a Fe 3% Si G.O. by an Fe-48% Co-2% V brings an increase in the magnetic flux constant section of the onboard transformer of the order of 20 to 25% for operating field amplitudes of 800 to 5000 A/m, thus about 0.5% increase in magnetic flux per % Co. The alloy of U.S. Pat. No. 3,881,967 allows a 1% increase in magnetic flux by 1% Co. but as stated above, this total increase (4%) was considered too low to justify the development of this material.

It has also been proposed, especially in document U.S. Pat. No. 3,843,424, to use a Fe-5 to 35% Co alloy having less than 2% Cr and less than 3% Si, and having a Goss texture obtained by primary recrystallization and normal grain growth. Compositions Fe-27% Co-0.6% Cr or Fe-18% Co-0.6% Cr are cited as making it possible to reach 2.08 T at 800 A/m and 2.3 T at 8000 A/m. These values would allow in operation, compared to a Fe-3% Si-G.O plate, operating at 1.8 T at 800 A/m, and at 1.95 T at 5000 A/m, to increase the magnetic flux in a given yoke section of 15% at 800 A/m, and of 18% at 5000 A/m, and therefore reduce the volume or weight of the transformer by the same amount. Thus, several compositions and methods for the production of low Co Fe—Co alloys (with possible additions of alloying elements) have been proposed, generally making it possible to obtain magnetic inductions 10 Oe close to those accessible with the commercial alloys Fe-48% Co-2% V but with levels of Co (and therefore cost) significantly lower (18 to 25%).

In cut-and-stack core technology it is not known that Fe—Ni alloys are used in aircraft transformers. In fact, these materials have a saturation magnetization called Js (at most 1.6 T for Fe—Ni50) much lower than for Fe—Si (2 T) or Fe—Co (>2.3 T) cited above, and also have magnetostriction coefficients for FeNi50 of $\lambda_{111}$=7 ppm and $\lambda_{100}$=27 ppm. This results in an apparent saturation magnetostriction $\lambda_{sat}$=27 ppm for a Fe—Ni50 polycrystalline material of the "non oriented" type (i.e. having no significant texture). Such a level of magnetostriction is at the origin of high noise, which explains why, in addition to a quite moderate saturation magnetization Js, that this material is not used.

In summary, the various issues facing aircraft transformer designers can arise in this way.

In the absence of a strong requirement with respect to noise due to magnetostriction, the compromise between the requirements with respect to a low inrush effect, a high weight density of the transformer, good efficiency, and low magnetic losses lead to the use of solutions involving magnetic cores wound in Fe—Si G.O., in Fe—Co, or in iron-based amorphous materials, or solutions involving magnetic cores in cut-and-stack pieces made of Fe—Si N.O. or Fe—Co.

In the latter case, cut-and-stack E or I cores of FeSi N.O. or G.O. electric steel, or of FeCo alloys such as Fe49Co49V2 are frequently used. But since these materials have a significant magnetostriction and the magnetization direction does not always remain in the same crystallographic direction in an E structure, these transformer structures may deform significantly and emit significant noise if their dimensioning is done with a usual work induction level of (about 70% of Js). To reduce the emission of noise, one must:

reduce the work induction, but it is then necessary to increase the section of the core in the same ratio, so its volume and weight maintain the same power transferred;

or acoustically shield the transformer, resulting in an additional cost and an increase in the weight and volume of the transformer.

Under these conditions, it is far from always possible to design a transformer that simultaneously meets the weight and noise constraints of the specifications.

As the requirements with respect to low noise magnetostriction are becoming more and more widespread, it is not possible to satisfy them with previous technologies other than by increasing the volume and weight of the transformer, because we do not know how to reduce the noise, other than by reducing the average $B_t$ work induction, thus increasing the core section and the total weight to maintain the same magnetic work flux, Bi should be lowered to about 1 T instead of 1.4 to 1.7 T for Fe—Si or Fe—Co in the absence of noise requirements. It is also often necessary to pad the transformer, resulting in an increase in weight and bulk.

Only a material with zero magnetostriction would, at first glance, solve the problem, and provided that it has a higher work induction than current solutions. Only the Fe-80% Ni alloys which have a saturation induction Js of about 0.75 T and the nanocrystalline materials for which Js is about 1.26 T, have such a low magnetostriction. But Fe-80% Ni alloys have a $B_t$ work induction that is too low to provide transformers that are lighter than traditional transformers. Only nanocrystalline materials would allow this lightening with the low noise required.

But the nanocrystallines pose a major problem in the case of an "onboard transformer" solution: their thickness is about 20 µm and they are torus wound in an amorphous supple state around a rigid support, so that the torus shape is retained throughout the heat treatment resulting in nanocrystallization. And this support cannot always be removed after the heat treatment in order to preserve the shape of the torus, and also because the torus is then often cut in half to allow an improved compactness of the transformer by using the wound circuit technology previously described. Only impregnating resins to the wound core can maintain it in the same form in the absence of the support which is removed after polymerization of the resin, But after a C-cut of the impregnated and hardened nanocrystalline core, there is a deformation of the C which prevents the two parts from being put back exactly face to face in order to reconstruct the closed torus, once the windings have been inserted. The constraints of fixing the C within the transformer may also lead to their deformation. It is therefore preferable to keep the support, but that results in an increase of the weight of the transformer. Moreover, the nanocrystallines have a saturation magnetization Js that is significantly lower than the other soft materials (iron, FeSi3%, Fe—Ni50%, FeCo, amorphous iron base alloys), which requires a significant increase of the weight of the transformer, since the increased magnetic core section will have to compensate for the drop in work induction imposed by Js. Also, the "nanocrystalline" solution would be used as a last resort, if the maximum noise level required is low, and if another lighter solution with low noise did not appear.

The aim of the invention is to propose a low-frequency electrical transformer design that is suitable for use in aircraft, and makes it possible to solve the technical problems that have been mentioned above in the best way possible, and to meet specifications involving:

- a very low inrush index, typically less than 0.8, whose precise sought value may depend on the type of power supply of the transformer, the type of electrical or electronic component of the transformer subjected to the inrush;
- a noise during operation, outside the periods when the inrush effect is felt, less than or equal to 80 dB, preferably less than or equal to 55 dB for a transformer to be placed in the cockpit;
- and a total weight of the smallest possible magnetic core obtained by a weight density of the greatest power possible, typically at least equal to 1 kVA/kg, and preferably greater than 1.25 kVA/kg, or even greater than 1.5 kVA/kg.

To this end, the object of the invention is an electric transformer core, of the cut-and-stack type, characterized in that it comprises two stacks or groups of stacks, each having a first thickness (ep1), wherein the stacks are each constituted of a single flat piece or of several identical flat pieces isolated from each other, whose main cutting directions are rectilinear and are either parallel or perpendicular to each other, wherein the stacks or groups of stacks face each other and comprise at least one residual air gap ($\epsilon$) that is calibrated with a maximum value of 10 mm between them, wherein the flat pieces are of at least one austenitic FeNi alloy containing Ni=30-80%, preferably Ni=40-60%, and at most 10%, preferably at most 2%, alloying elements and impurities resulting from the preparation, while the balance is iron, wherein the alloy has an acute cubic texture {100} <001>, of which at least 80% of the grains, preferably at least 95% of the grains, deviate by an angle ($\omega$) of not more than 20° from the ideal orientation {100} <001>, both main cutting directions of the flat pieces being substantially parallel to either the rolling direction or to the direction transverse to the rolling direction, with the crystallographic plane (100) deviating at most 20° from the rolling plane, preferably at most 10°, better still at most 5°, while the axes [001] or [010] and, respectively, the rolling direction or the transverse direction deviate from an angle ($\alpha$) at most equal to 20°, preferably at most equal to 10, more preferably at most 5°, the flat pieces having magnetic losses in sinusoidal induction waves from the magnetic core, for a maximum induction of 1 T, less than 20 W/kg at 400 Hz, preferably less than 15 W/kg, and better, less than 10 W/kg, the apparent magnetostriction for a maximum induction of 1.2 T being less than 5 ppm, preferably less than 3 ppm, more preferably 1 ppm, when the measurement is performed on an elongated rectangular sample, the field being applied in the direction of the large side of the sample and this direction being parallel to the rolling direction, the apparent magnetostriction for a maximum induction of 1.2 T being less than 5 ppm, preferably less than 3 ppm, more preferably 1 ppm, when the measurement is made on an elongated rectangular sample, the field being applied in the direction of the long side of the sample and this direction being parallel to the direction transverse to the rolling direction and lying in the rolling plane, and the apparent magnetostriction for a maximum induction of 1.2 T being less than 10 ppm, preferably less than 8 ppm, more preferably 6 ppm, when the measurement is made on an elongated rectangular sample, the field being applied in the long direction of the sample and this direction being parallel to the intermediate direction at 45° of the rolling direction and from the transverse direction.

The stacks may each be C-shaped, E-shaped or I-shaped.

The core may then be formed by two E-shaped sub-cores facing each other.

The core may then also be formed by a stack of E-shaped flat pieces placed head to tail, the empty spaces between the lateral branches of the E-shaped flat pieces being filled by I-shaped flat pieces of the same composition and texture as those of the E-shaped flat pieces, with air gaps ($\epsilon$) being present between the E-shaped flat pieces and the I-shaped flat pieces.

The core may then also be formed by an E-shaped sub-core, and an I-shaped sub-core facing each other.

The core may then also be formed by two C-shaped sub-cores facing each other.

The core may then also be formed by two contiguous sets of two C-shaped sub-cores, the sets facing each other.

Alternatively, the core may be formed by a succession of layers of stacks, two successive layers being placed head to tail and separated by an air gap ($\delta_2$).

At least one of the stacks may consist of several flat pieces of identical shape each separated by an air gap ($\delta_1$).

The alloying elements may be chosen from at least one of Cr, Si, Al, Zr, Mo, W, V, Nb, Cu, Mn.

The cut flat pieces may have a symmetry.

The grain size of the parts may be less than or equal to 200 µm.

The transformer core may also comprise second stacks of flat pieces, having a second thickness (ep2), of the same shape as the stacks having a first thickness (ep1) and superposed on them, the flat pieces of the second stacks being in at least a material having a saturation magnetization greater than or equal to 2 T, the second stacks being less than 50% of the core volume.

The flat pieces of the second stacks may be made of at least one material selected from FeCo alloys, FeCo (V, Ta, Cr, Si, X) alloys, where X is selected from one or more Mo, Mn, Nb, Si, Al, FeCoSi alloys, soft iron, steels, ferritic stainless steels containing 5-22% Cr and 0 to 10% total of Mo, Mn, Nb, Si, Al, V, non-oriented FeSiAl electrical steels.

The air gap ($\epsilon$) between two stacks or groups of stacks facing each other may have a different width between the first stacks having a first thickness (ep1) and between the second stacks having a second thickness (ep2).

The gap (ε) may have a width (ε1) of between 2 and 1500 μm between the stacks having a first thickness (ep1), and a width (ε2) of between 2 and 3000 μm between the stacks having a second thickness (ep2).

The object of the invention is also a single-phase or three-phase electrical transformer comprising a cut-and-stack magnetic core, characterized in that the magnetic core is of the preceding type.

It may be a transformer intended to be on board an aircraft.

It may be a transformer intended to be placed in the cockpit of an aircraft.

As will be understood, the invention consists in adopting the most typical "cut-and-stack core transformer technology using superposed plates of magnetic material in E, I or C", most often arranged to form stacks, i.e. groups of plates substantially identical in shape, size, chemical composition and texture (when, for a plate of a given stack, the texture is important for the properties of the core that one wants to obtain), superposed, and to associate the following characteristics with it:
- a high density of power density and/or weight at a frequency of 400 Hz in sinusoidal induction waves, typically at least 1.5 kVA/kg and preferably greater than or equal to 3 kVA/kg or even greater than or equal to at 4 kVA/kg; low magnetic losses at 400 Hz in sinusoidal induction waves originating from the magnetic core, namely less than 20 W/kg, preferably less than 15 W/kg, and more preferably less than 10 W/kg, for a maximum induction of 1 T;
- an apparent magnetostriction with a maximum induction of 1.2 T $\lambda_s^{1.2\ T}$ less than or equal to 5 ppm, preferably less than or equal to 3 ppm, better still less than or equal to 1 ppm, when the measurement is made on an elongated rectangular sample (Epstein type or typically 100×10 mm$^2$), the field being applied in the long direction of the sample and this direction being parallel to the rolling direction DL of the plate;
- an apparent magnetostriction with a maximum induction of 1.2 T $\lambda_s^{1.2}$ less than or equal to 5 ppm, preferably less than or equal to 3 ppm, better still less than or equal to 1 ppm, when the measurement is performed on an elongated rectangular sample (Epstein type or typically 100×10 mm$^2$), the field being applied in the direction of the long side of the sample and this direction being parallel to the transverse direction DT of the plate;
- an apparent magnetostriction with a maximum induction of 1.2 T $\lambda_s^{1.2}$ less than or equal to 10 ppm, preferably less than or equal to 8 ppm, better still less than or equal to 6 ppm, when the measurement is made on an elongated rectangular sample (Epstein type or typically 100×10 mm$^2$), the field being applied in the direction of the large side of the sample and this direction of the large side of the sample being parallel to the 45° intermediate direction of DL and DT;
- a magnetic remanence $B_r$ of the major hysteresis cycle of the global magnetic circuit that may be adjusted to a more or less low value by means of the various air gaps distributed between the cut pieces.
- the presence of at least one residual or calibrated air gap at each level of superposition of the plates.

In some cases, we can replace the stacks of identical plates, or only some of them, by single parts more weighty than simple plates.

The solution chosen by the inventors makes it possible to preserve the interest in the compact construction of the transformer, allowing a high power density, thanks to the cut pieces then arranged according to the invention, in the same way as the magnetic cores in pieces conventionally cut for a transformer using Fe3% Si or FeCo. It also makes it possible to emit little noise thanks to an appropriate choice of the materials and/or their microstructures with respect to the directions taken by the magnetization in the superposed E's and I's. It finally makes it possible to limit the effect of inrush by the access to high magnetic fluxes in transient periods, by obtaining a low remanence of the magnetic circuit.

A good compromise for an onboard transformer with a magnetic yoke of the cut-and-stack type, to meet the cumulative requirements of low magnetic losses, low Inrush effect, low A.Tr, low-loss conductor, low to very low acoustic noise emitted, and high power density, is achieved by the following general solution, developed here in the most constraining case of a three-phase transformer, and illustrated in the accompanying figures, wherein.

Figure 1:
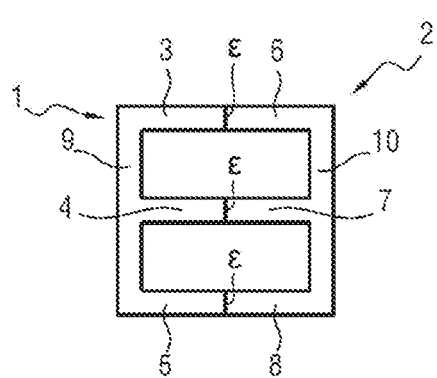
FIG. 1 to 6 show schematically various possible configuration examples for magnetic cores of transformers made according to the invention.

The elementary module of the invention is a magnetic core of a cut-and-stack type structure in flat pieces in the form of E, I, C, or any other pieces whose sides of the different pieces are rectilinear, and are either parallel or perpendicular to each other. This magnetic core is produced by the use of at least one austenitic FeNi alloy with a texture {100} <001>, conventionally called a "cubic texture", of typical composition Fe50%-Ni50% by weight (FeNi50), so that the two main cutting directions of the E, I, C (or other) shaped pieces are parallel to either the roll direction DL or the transverse direction DT (the direction perpendicular to DL and located in the rolling plane). Thus, the E, I, C or the like are arranged to form a magnetic yoke around the previously made windings of the transformer. This type of structure is suitable for single-phase or three-phase transformers, for example.

The inventors were surprised to find that in such a configuration, the FeNi (typically FeNi50) cores, which nevertheless have strong magnetostriction coefficients $\lambda_{100}$ and $\lambda_{111}$, suffer from small mechanical deformations and emit only low noise as well in a single-phase transformer configuration (C+C or C+I) as in a three-phase transformer configuration (E+E or E+I).

The inventors also found that if the work induction $B_t$ is too close to saturation magnetization Js, then the effect of inrush is no longer sufficiently damped.

The inventors also found that if a minor proportion of cut pieces of high saturation and high magnetostriction material (such as FeSi or FeCo) is added to the previous FeNi core, then the inrush effect is better damped for an identical total weight of the magnetic core.

The proposed solution consists in designing a magnetic core of the cut-and-stack type structure in flat pieces in the shape of E, I, C or the like, in which the different sides of these parts are rectilinear, and are either parallel or perpendicular to each other. Preferably, the cut pieces and/or more generally the stacks (cut pieces/plates) have a symmetry, but it is not absolutely essential. For example, the central branch of an E could be closer to one side branch than to the other side branch.

The parts of different materials superposed on each other to form the stacks do not necessarily have the same width over all their corresponding portions. In particular, the various rectilinear portions of the cubic texture FeNi pieces (forming the main element of the magnetic core) preferably have a width greater than that of the corresponding rectilinear portions of the complementary optional pieces made of high saturation and high magnetostriction material. (FeSi or FeCo, for example), which are preferably placed on one side or on both sides of the stack of pieces FeNi. This allows in particular the "rounding" of the angles of the section of the magnetic core, on which it then becomes easier to wind the copper conductors. This also minimizes the amount of copper used for winding, if necessary, to attenuate the inrush effect sufficiently, wherein the width of FeCo/FeSi portions is compensated by an increase in the number of pieces forming the stacks.

The pieces forming the main element of the magnetic core are, according to the invention, cut in a FeNi austenitic alloy strip hardened according to a metallurgical method making it possible to obtain, after annealing, a texture {100} <001>, of the type known as the "cubic texture". The pieces are cut in such a way that:
  either the rolling direction DL which is oriented in the crystallographic direction <001> is parallel to the long sides of the lateral branches of E or C; then the transverse direction of the plate DT which is oriented in the crystallographic direction <100> is parallel to the back of the E or C (in other words on the E or C side which connects their lateral branches);
  or the rolling direction DL which is oriented in the crystallographic direction <001> is parallel to the back of the E or C; then the transverse direction DT which is oriented in the crystallographic direction <100> is parallel to the long sides of the side branches of E or C.

If the piece is cut into an I shape, comparable precepts apply.

In other words, the cutting edges of the various rectilinear portions of the core pieces must always be substantially parallel to their respective DL or DT, otherwise there is a rapid degradation of the noise performance of the transformer when there is, for example, a disorientation between DL and the crystallographic direction <100>.

Typically (but not exclusively), the cut pieces each have a thickness of 0.1 to 0.3 mm. In all the tests that will be described later, each cut piece had a thickness of 0.2 mm.

FIG. 1 to 6 show very schematically various non-limiting examples of possible configurations for the transformer cores according to the invention, identified with respect to the directions DL and DT of their respective pieces. The direction DN, which forms with DL and DT an orthogonal coordinate system, and which therefore corresponds substantially to the direction of superposition of the different pieces making up the core, has also been represented.

FIG. 1 shows a transformer core three-phase double E, i.e. formed by two sub-cores E 1, 2 placed face to face. The lateral branches 3-8 and the backs 9, 10 to which they are attached all have identical sections.

Figure 2:
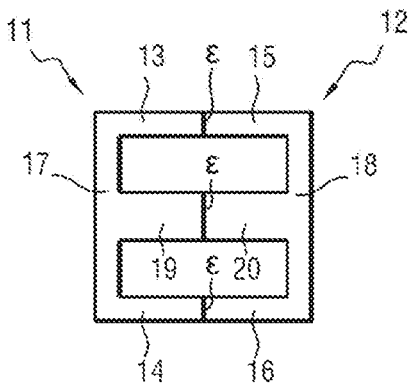

FIG. 2 shows a single-phase transformer core, consisting of two sub-cores E 11, 12 placed face to face, Their outer lateral branches 13-16 and their backs 17, 18 have the same section, while the inner lateral branches 19, 20 have sections equal to twice the section of the other branches 13-16 and backs 17, 18. In a single-phase transformer, this provides a very compact configuration for a given power, compared with the configuration shown in FIG. 5.

Figure 3:
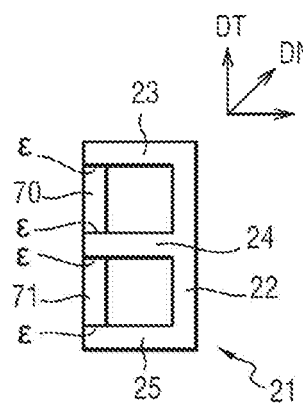
Figure 4:
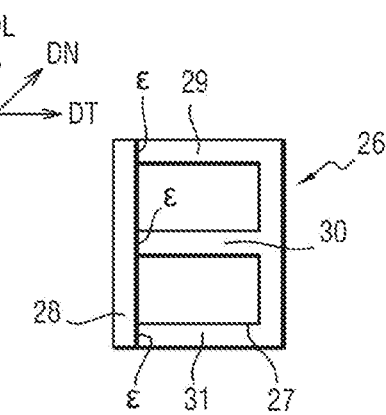

FIG. 3 shows a three-phase transformer core 21 in the overall shape of an "eight" with identical sections for its back 22 and for each branch 23, 24, 25, the E-pieces being superposed head-to-tail. This means that two successive superposed pieces of the core 21 are superposed alternately, one having its back 22 placed on the right and its lateral branches 23, 24, 25 facing to the left, and the other having its back placed on the left and its side branches facing to the right. This gives empty spaces between the lateral branches 23, 24 and 24, 25 of each E-piece. To obtain a constant and uniform section of magnetic material over the entire core 21 and, therefore, optimal performance of the core 21, in this configuration, these empty spaces are filled by I-shaped flat pieces 70, 71. Thus air gaps ε are created on each level of superposition between the lateral branches 23, 24, 25 of the E-shaped flat pieces and the ends of the flat pieces 70, 71 in the form of I. The presence of these air gaps ε ensures that this example is good according to the invention, FIG. 4 shows an E+I core 26, also forming an "eight" core for a three-phase transformer and having an air gap ε between the E and the I. In this type of structure, the sub-core in E 27 is closed by a sub-core 28 in I connecting the ends of the branches 29, 30, 31 of E 27. This configuration may be achieved in two ways:
  it may be obtained by placing at each level of superposition of the core 26 an E-piece and an I-piece which is contiguous to it, and by arranging the E-pieces of two successive levels head-to-tail; there is thus a section of constant magnetic material over the entire core 26 while retaining the "eight" shape of the variant of FIG. 3;
  it may be obtained by joining a stack of pieces E and a stack of pieces I.

Figure 5:
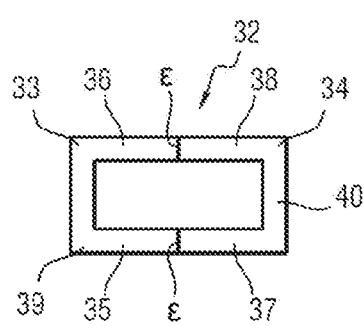

FIG. 5 shows a core 32 of a single-phase transformer formed by two sub-cores 33, 34 in C placed face to face, the branches 35, 36, 37, 38 and the backs 39, 40 of each C all having the same section and all being rectilinear with branches 35-38 perpendicular to the backs 39, 40.

Figure 6:
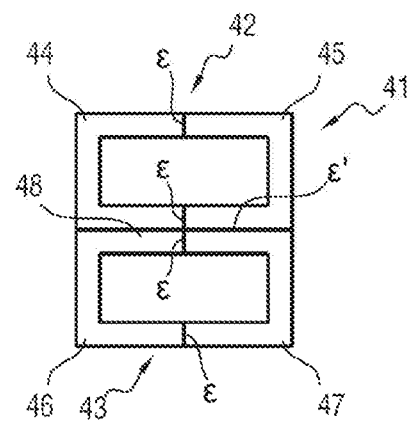

FIG. 6 shows a core 41 of a single-phase transformer formed by two sets 42, 43 of C sub-cores 44, 45, 46, 47 placed face to face with branches and rectilinear backs of the same section, the two sets 42, 43 (which are each of the same type as the core 32 of FIG. 5) being contiguous with a residual or calibrated air gap ε' which separates them, the core of FIG. 2, so with the inner side branch 48 to form a core 41 whose general shape is comparable to that of a double section of those of the other lateral branches and backs. There is therefore a core 41 in the general shape of an "eight" having two residual air gaps ε and ε' or calibrated perpendicular to each other and dividing the core into four symmetrical pieces.

The austenitic alloy FeNi used in the context of the invention may contain from 30 to 80% of Ni, but more preferably from 45 to 60% of Ni to obtain the highest possible saturation magnetization Js and thus to be able to reduce as far as possible the section of the different pieces of the core, and thus the weight of the core.

The alloy may contain up to 10% by weight in total of addition elements such as Cr, Si, Al, Zr, Mo, W, V, Nb, Cu, Mn, as well as any residual elements and impurities which are usually found in alloys made in an arc or induction furnace without having been added voluntarily. Preferably, the total of these residual and impurity addition elements will be at most 2%. A significant addition of certain other elements than Ni may have the advantage of limiting the induced current losses in the magnetic plates by increasing the resistivity of the alloy. But the counterpart will be a degradation of Js. This reason justifies the 10% and 2% limits mentioned above.

It may be possible to use different alloys in the stacks of the same core, by arranging them in the form of successive layers of defined thicknesses or by mixing them inside the stack, if it is of interest, for example, in terms of core performance. But each of these alloys must meet the compositional requirements mentioned above.

The cut pieces in the form of E, I, C or the like are then electrically insulated from each other by an insulating, the thickness of which is 1 to a few microns, which is deposited on the surface of the hardened strip. Two flat pieces superposed in a stack are separated by at least one layer of insulating coating. Insulation materials, such as organic resins (often called "insulation varnishes" or "coatings") or oxides such as CaO or MgO or $Al_2O_3$, may be used for this insulation in a known manner. It is also possible to preferentially oxidize the surface of the pieces during oxidative annealing leading to the surface formation of Fe and Ni oxides. It is also possible to phosphate the surface of the part on a bonding layer of Ni and Fe oxides. This list of isolation processes is, of course, not limiting. In particular, it is possible to replace the deposit of insulating material described above by inserting, between the pieces to be insulated, during the formation of the stack, plates of insulating and non-magnetic material of calibrated thickness (typically a few tens of microns to a few tenths of a millimeter), which would also have the function of adjusting the air gap separating two stacks for certain configurations of the core. Examples of such materials are plastic, paper, cardboard, rigid foam, insulating and non-magnetic composite. The insulation deposit and the insertion of insulating plates may be cumulated.

It should be understood that "stacking", in the sense in which it is understood in the description, may, if it proves that this makes it possible to obtain the desired results, be constituted of a single cut piece, more or less thick. In the general case, it will however be preferable to use, for a given total thickness, several relatively thin identical plates, isolated from each other, to form the "stack", in particular to limit the formation of eddy currents which could degrade core performance.

The pieces are then annealed under a protective gas (Ar, $H_2$, $H_2+N_2$, $N_2$ or the like), for a few minutes to a few hours, in order to obtain a homogeneous grain structure of size typically less than or equal to 200 μm, a total absence of abnormal growth (which would generate large grains badly oriented crystallographically), and an acute cubic texture, i.e. with at least 80%, and preferably at least 95%, of grains having their crystallographic orientation deviating from an angle to equal to at most 20° to the ideal orientation {100}<001>.

Alternatively, texturizing annealing, and then the deposition of electrical insulating coating, may be performed before cutting the pieces.

The pieces annealed and coated with electrical insulation, are superposed to form the "stacks" (wherein they could possibly, at least for some of them, each be constituted of a single piece), the stacks possibly being separated from each other by plates of insulating material, so that the E, I, C or the like, which allow the stacks to build up by their overlays and/or their juxtapositions, to form a magnetic yoke around which are arranged previously made windings. But we could however make windings after assembling the yoke. This type of structure is suitable, for example, for single-phase or three-phase transformers.

The establishment of an insulator between the stacks is not essential, but it allows, thanks to the control of the air gap ε, ε' that it enables better control the remanence of the magnetic circuit and the magnetizing current of the transformer, increases the performance of inrush, and makes the performance of transformers in an industrial production more reproducible.

It is not obligatory, but advantageous, to superpose stacks of FeNi parts with other stacks containing a minority volume proportion (i.e. constituting less than 50% of the total volume of the core) of parts having the same shape as those FeNi cited above, and dimensions identical or very similar to those of these same parts, but made of high saturation magnetic materials known in themselves such as FeSi and FeCo. They are superposed by being electrically insulated from each other, in the same way as FeNi parts.

These high saturation materials operate at very low induction in the transformer. These high-level materials may be: Fe-3% Si, Fe-6.5% Si, Fe-15 to 50% Co—(V, Ta, Cr, Si, X) textured or not, with X selected from one or more of Mo, Mn, Nb, Si, Al, soft iron, some steels, Fe—Cr ferritic stainless containing 5 to 22% Cr by weight and 0 to 10% total of Mo, Mn, Nb, Si, Al, V, Fe—Si—Al N.O. electric steels, all of which have a Js value well above the 1.6 T of FeNi50 (which has the highest Js among the austenitic FeNi). A Js of at least 2 T is required.

Examples of conventional high Js materials with their magnetic operating point B(H) given at 800 A/m ($B_{800}$) and 8000 A/m ($B_{8000}$) are given in Table 1 below (the compositions given are, of course, approximate and do not exclude the presence of other alloy elements in relatively small quantities; likewise the list of examples does not claim to be exhaustive and any material with comparable characteristics may be used). In fact, it is around the elbow of the curve B(H), towards $B_{800}$ in this type of material, that one reaches the best compromise between reduction of volume (high B) and low consumption of the transformer (low A.tr). The $B_{8000}$, on the other hand, accounts for the saturation induction approach, which is used not only in the power density potential ($B_r < B_{8000}$) but also in the reduction of the inrush effect.

TABLE 1

Compositions of high Js materials usable in the invention and their magnetic operating points at 800 A/m and 8000 A/m

| Alloy | % Co | % Si | % Cr | % V | Fe | Js | $B_{800}$ (T) | $B_{8000}$ (T) |
|---|---|---|---|---|---|---|---|---|
| 1 | 15 | | | | Remainder | 2.25 | 2.08 | 2.24 |
| 2 | 15 | 1 | | | Remainder | 2.21 | 1.95 | 2.18 |
| 3 | 18.5 | | | | Remainder | 2.32 | 2.12 | 2.30 |
| 4 | 18 | 1 | | | Remainder | 2.26 | 2 | 2.23 |
| 5 | 10 | | | | Remainder | 2.22 | 2.01 | 2.12 |
| 6 | 27 | | 0.5 | | Remainder | 2.38 | 2.03 | 2.28 |
| 7 | 48 | | | 2 | Remainder | 2.35 | 2.1 | 2.35 |
| 8 | 0 | 3 | | | Remainder | 2.03 | 1.9 | 2 |

In the examples that follow, we will consider the case of three-phase transformers, requiring the cutting of E and/or I shaped planar pieces.

Figure 7:
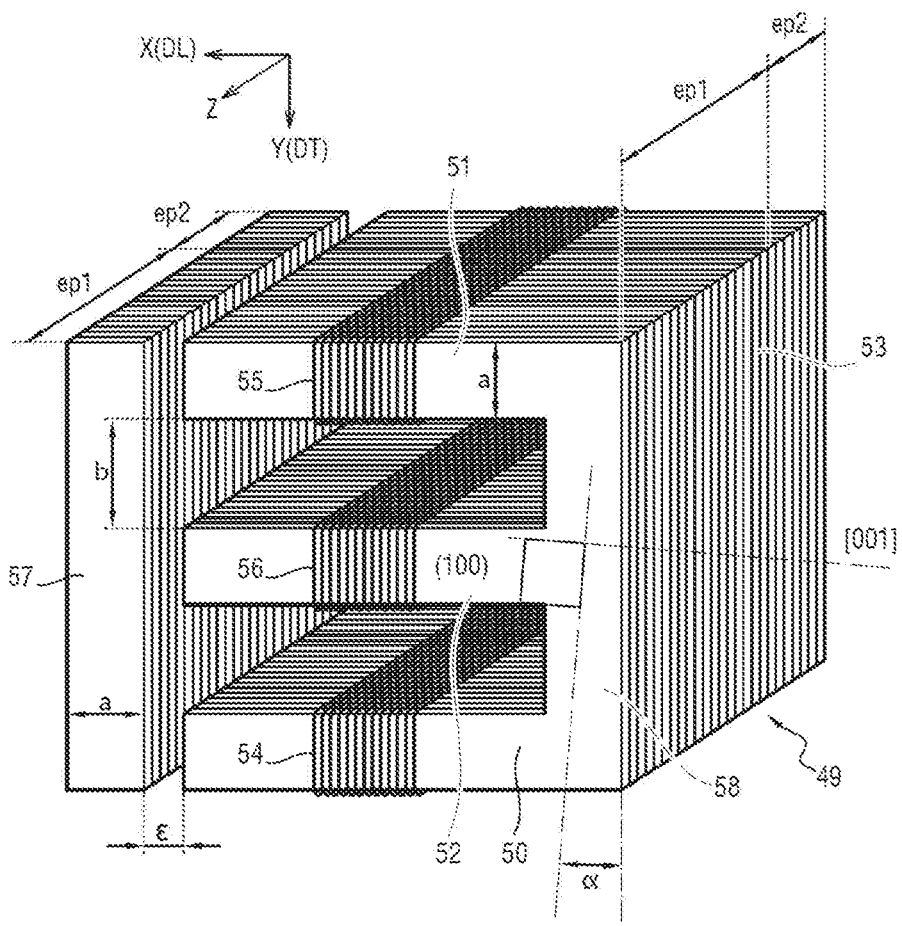
FIG. 7 shows in greater detail an example of an "E+I" transformer core according to the invention.

In a first example shown in FIG. 7, a transformer core 49 having an E+I structure of the type shown diagrammatically in FIG. 4 is used. The two outer lateral branches 50, 51 and the inner lateral branch 52 of the stack E 53 each carry one of the windings 54, 55, 56 of each phase of the transformer. The I-stack 57 is attached to the free ends of the lateral branches 50, 51, 52 of the E 53. Each stack 53, 57 is produced, according to the invention, by superposing on a thickness ep1 of cubic Fe alloy plate metal. Typically containing 40 to 60% Ni, the stacks E 53 and I 57 are separated by a gap s. Note that in this example, the back 58 and the three lateral branches 50, 51, 52 of the stack E 53 and the stack I 57 all have the same width a. The two stacks E 53 and I 57 are superposed on two other stacks, E 53' and I 57', themselves composed of a superposition of plates of high Js thick material ep2, so that the two pairs of stacks E 53, 53' and I 57, 57' have a total thickness ep1+ep2, in the non-limiting example shown, the plates of the stacks 53', 57' of high-material Js have the same shapes and dimensions as the plates constituting the stacks 53, 57 on which they are superposed.

In this example, the straight cut sides of the superposed plates constituting the stacks E 53, 53' and the superposed plates constituting the stacks I 57, 57' are aligned on the axes DL (rolling direction of each plate) and DT (direction perpendicular to the rolling direction of each plate) of the cubic texture plate FeNi, crystallographically designated {100} <001>. In the example shown, the axis of the lateral branches 50, 51, 52 of the E 53 is aligned with DL while the I 57 and the back 58 of the E are aligned along DT. But we could as well have reversed the cut layout while remaining within the scope of the invention. It is the alignment qualities of the <100> axes on DL (or on DT) and the plane (100) on the rolling plane, which surprisingly determine the reduction of vibrations and noise emitted by the magnetic core. The crystallographic plane (100) of the ideal "cubic" orientation is shown in FIG. 7 as being perfectly parallel to the rolling plane (which is the plane of the E 53), but up to 20° of disorientation may be accepted between these two planes so that the surprising effect is significant. Preferably this disorientation ω is at most 10°, more preferably at most 5°. Similarly, it is possible to accept up to 20° of disorientation α between the axes [001] or [010] and, respectively, DL or DT, so that the surprising effect is significant (see FIG. 7 for a visualization of this disorientation α). Preferably, this disorientation α is at most 10°, more preferably at most 5°.

It is the same, of course, for the plates of the I-stack 57, and it would be the same for the plates of a stack of C, such as those shown schematically in FIGS. 5 and 6.

Thus in the case of a cubic texture having at least 80% (in surface or volume) grains having such orientations ω and α (i.e. disoriented at most by 20° according to the different axes and plane considered), we observe the surprising phenomenon of very small vibrations of the transformer core 49 in its entirety, and therefore a low magnetostrictve noise.

Moreover, the adjustment of the air gap ε between the E 53 and the I 57 makes it possible to establish the equivalent permeability of the magnetic circuit, and at the same time regulates the remanence of the magnetic circuit. The width of this gap ε may be adjusted by shims.

In addition, the superposition, as shown, of stacks 53', 57' with a thickness ep2 of E or I plates in a high saturation material (FeCo or FeSi, for example) at each of the two stacks 53, 57 allows this material to participate in the damping of the inrush effect which allows the main part in FeNi of the transformer to be sized to work the transformer to a higher induction.

It is thus possible to reduce the section and the weight of the magnetic circuit. Those skilled in the art know how to find the right compromise between the added weight of FeCo or FeSi compared to the weight saving FeNi for the same ep1+ep2 thickness of the core 49.

It should be understood that plates of this high-Js material do not need to have a particular type of texture. In the case where they have any marked texture, this texture is not necessarily oriented in a precise manner with respect to DL and DT. Only the orientations of the cut edges of the plates relative to DL and DT are significant, in that these orientations are identical to those of the cut sides of FeNi plates with a cubic texture of the low magnetostriction material.

Figure 8:
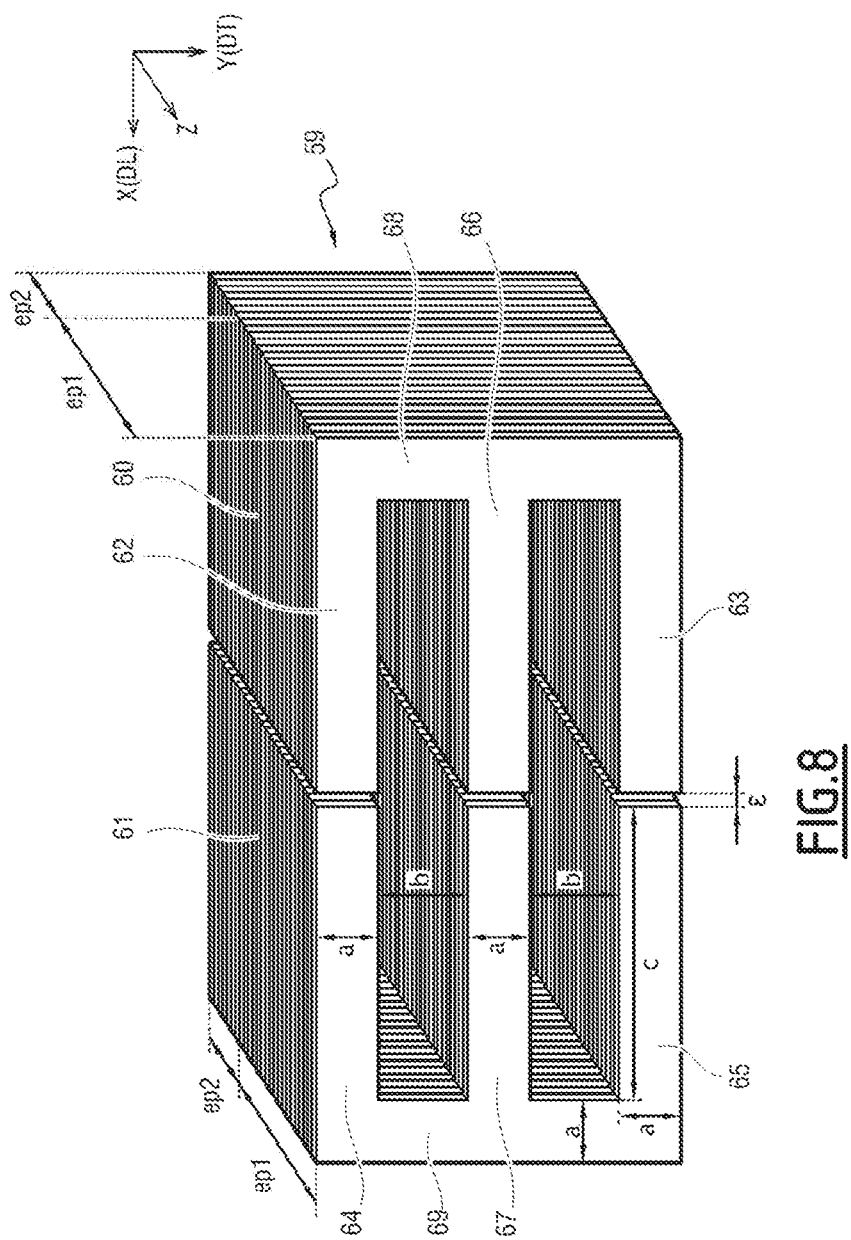
FIG. 8 shows an example of a "double E" transformer core according to the invention.

In a second example of a three-phase magnetic transformer core according to the invention known as "double E", represented in FIG. 8 (this time, the windings are not represented), the core 59 of the transformer is presented in the form of two stacks 60, 61 in columns of plate elements, each out into an E-shape, the two stacks 60, 61 being arranged face to face to form a magnetic circuit and separated by a gap ε. The width of this gap s may be adjusted by shims. We find the configuration shown schematically in FIG. 1. The outer side branches 62, 63, 64, 65 and inner side branches 66, 67 have the same width a, equal to the width of the backs 68, 69 which connect them. The lateral branches 62-67 of all the stacks 60, 61 have the same length c, while the lateral branches 62-67 of each stack are spaced from each other by a length b.

Each of these stacks 60, 61 is made from one or, preferably, several cut plates which are at least predominantly in volume, i.e. for more than 50% of the total volume of the core, of one first material which is a 30-80% (preferably 45-50%) FeNi alloy with a {100} <001> cubic texture, and is insulated or separated by an insulating plate, as explained previously. These FeNi plates are superposed on a thickness ep1. The orientation a of the texture of the plates with respect to the directions DL and DT as defined previously and illustrated for the example of FIG. 7 is also present in this example and is not repeated in FIG. 8.

Preferably, as in the examples shown in FIGS. 7 and 8, the core is supplemented by superpositions of thickness ep2 each consisting of one or, preferably, several plates of a second material, with a high content, such as those defined in Table 1.

The presence of an air gap ε between two opposing stacks is mandatory in the context of the invention (in the absence of such an air gap ε, one would have, for the configurations of FIGS. 7 and 8, an unbroken "eight" structure core, not in accordance with the invention). It is advantageous from several points of view:

it makes it possible to lower the remanent induction of the magnetic circuit;
it facilitates the assembly of the windings;
it is preferable for filling the winding window, therefore for increasing the volume power density.

The air gap ε may, moreover, have a different width for the two groups of plates, that of FeNi textured plates and that of plates of high material Js.

The possible presence of an air gap s of a different value for the two groups of plates is also valid for the other variants of cores according to the invention, in particular for the variant of FIG. 7. It will be noted that in the variant of FIG. 3 that it is the air gaps E separating the I-plates 70, 71 from the branches 23, 24, 25 of the E-plates between which they are placed, which play the role of the air gap s visible in FIGS. 6 and 7.

The trend in civil aviation is designing onboard transformers with acoustic noise emitted increasingly low or very low when it is located next to the cockpit allowing pilots to communicate without a headset. Like any onboard component, the transformer must be the lightest and the least bulky possible, consume as little power as possible, and heat up as little as possible, and also be able to be subject to be submitted without damage to its integrity (its insulators, its electronic components) to large variations in charge, i.e. large variations in the inrush current of the transformer. This inrush current should be as low as possible, as we have seen.

It is established in recent literature that the maximum inrush current (magnetizing transient current of a transformer) is proportional to $(2B_t+B_r-B_s)$ where $B_t$ is the nominal work induction (resulting from the sizing of the magnetic circuit), $B_r$ is the residual induction of the major hysteresis loop of the magnetic circuit (i.e. of the assembly consisting of the ferromagnetic core and air gaps localized or distributed according to the structure of the core construction), and $B_s$ is the saturation induction of the core.

To get a low maximum inrush current, one needs:
a high saturation magnetization material (FeSi or FeCo, which are preferred to FeNi and nanocrystalline materials);
a magnetic circuit (and not just a material constituting the core considered alone) with low remanence, which may be obtained either directly by the choice of material (example of the flat hysteresis cycle of nanocrystalline alloys), or by a construction effect of the yoke (distributed or localized gaps, producing a sufficient demagnetizing field)
low $B_t$ work induction; but this is antinomic with the high power density, the miniaturization and the lightening of the transformers, and therefore does not constitute a satisfactory solution to the problem, unless structural features of the core that are advantageous on other points (including noise) allow the core to maintain a bulk and weight that are still acceptable for relatively low $B_t$;
a small section of magnetic core which would lead to using a high saturation material;
a large cross-section area of the windings.

In short, if we consider only the question of the inrush, the ideal magnetic circuit includes an alloy with high saturation magnetization (FeSi, FeCo) and low remanence that is used at reduced induction. This involves an optimized design and dimensioning of the magnetic circuit, and an adequate calibration of the air gap(s) of these materials with high saturation magnetization Js. An air gap of the order of 1 μm typically between two C-shaped or E-shaped or E-shaped and I-shaped sub-cores will have little effect on the intrinsic remanence of the material, and then a FeNi50 cubic texture {100} <001> retains its very high remanent induction (close to Js=1.6 T, typically 1.4 to 1.55 T). In this case of the air gap, and according to the formula giving the inrush index above, the damping of the inrush effect will not be very good. To reduce the remanence a gap of, for example, 200 or 600 μm, or 0.1 mm (calibrated by a deposit or a layer of added material) is introduced between the layers of cut parts, and also between the cut parts as E 53 and I 57 in the example of FIG. 7. The value of the air gap required for a significant reduction of $B_r$ depends very much on the configuration of the stacks of different magnetic pieces, as will be seen below in the description of the examples according to the invention and the results which they make it possible to obtain with respect to the reference examples. In this case, the remanent induction $B_r$ may be reduced, ranging from a few % to a few tens of %, Note that we do not, conversely, exaggerate the width of the air gap ε, because according to Ampere's theorem, it would require much more magnetizing current, so would cause more heating up through the Joule effect, more power consumption, and decreased performance. We must therefore find a good compromise between a low inrush on the one hand and low heating and current consumption on the other hand. Those skilled in the art will know by calculation and experience how to find a judicious balance between these requirements.

In the optional case where we want to add a second material, which itself has a high Js (FeCo or FeSi), in order to further dampen the inrush, we want this second material to function very little in steady state, so that it is only a little, even very little magnetized by the magnetizing current defined for the first material (cubic FeNi) with its air gap(s). In fact the second high Js material is mainly present to function under transient conditions during strong current draws of the transformer. If it magnetized largely also in the steady state of the transformer, then its high magnetostriction would cause a crippling noise for the transformer. In order to limit its magnetization, it is possible to introduce into the stacks comprising this second material at high Js, a specific air gap $ε_2$ whose value, which may be different from that of the air gap $ε_1$ separating the stacks comprising the cubic texture FeNi, is obtained from the application of the Ampere theorem, the magnetizing current of the transformer in steady state, and the magnetic characteristics of the second material. For example, in the example of FIG. 7, if the gap $ε_1$ between the stack of FeNi plates at E and the stack of FeNi plates at I is 0.1 mm, it may be necessary to introduce a 0.2 mm gap $ε_2$ between the stack of the E high material Js and the stack of I high material Js. The intermediate layers preferably used to calibrate the air gaps $ε_1$ and $ε_2$ may be any very lightweight non-magnetic insulating material such as paper, cardboard, plastic, rigid foam, composite, etc.

In general, $ε_1$ may preferably be between 2 and 1500 μm, while $ε_2$ may be preferably between 2 and 3000 μm.

These values may also be transposed in particular to the E+E configuration of FIG. 8.

If we combine the constraints of small size and low weight, low magnetic losses, low to very low acoustic noise and low inrush effect in an aircraft transformer, it still remains to identify the most interesting solutions to optimize each constraining magnitude previously described. Table 2 summarizes the reflections of the inventors on this point, in the case, according to the invention, of cut/stacked magnetic circuits (in E, I, or C):

TABLE 2

Expected properties of the materials used to constitute a monomaterial core for cut-and-stack circuits
(Decreasing interest ratings: excellent > very good > good > average > poor > bad)

| Material | Air gap $ε_1$ (μm) | Thickness (mm) | Hc (A/m) | $B_i$ (T) | Power density | Acoustic noise emitted | Magnetic losses | A.tr and driver losses | Inrush effect | Cost |
|---|---|---|---|---|---|---|---|---|---|---|
| Ideal material | | | | | excellent | excellent | excellent | excellent | excellent | excellent |
| Fe3% Si—N.O. | residual | 0.2 | 40-50 | 1.8 | very good | bad | poor | good | poor | excellent |
| Fe3% Si—G.O. | residual | 0.18 | 20 | 1.8 | very good | bad | poor | good | poor | excellent |
| Fe3% Si—N.O. | 900 μm | 0.2 | 40-50 | 1.8 | very good | bad | poor | average | poor | excellent |
| Fe3% Si—N.O. | 900 μm | 0.2 | 25 | 1 | good | bad | average | average | good | excellent |

TABLE 2-continued

Expected properties of the materials used to constitute a monomaterial core for cut-and-stack circuits
(Decreasing interest ratings: excellent > very good > good > average > poor > bad)

| Material | Air gap $\varepsilon_1$ (μm) | Thickness (mm) | Hc (A/m) | $B_r$ (T) | Power density | Acoustic noise emitted | Magnetic losses | A.tr and driver losses | Inrush effect | Cost |
|---|---|---|---|---|---|---|---|---|---|---|
| Fe3% Si—N.O. | 900 μm | 0.2 | 25 | 0.5 | bad | very good | excellent | average | exellent | excellent |
| Fe—50% Co | residual | 0.2 | 30-40 | 2.1 | excellent | bad | poor | poor | poor | poor |
| Fe—50% Co | 900 μm | 0.2 | 20-40 | 2.1 | excellent | bad | average | average | poor | poor |
| Fe—50% Co | 900 μm | 0.2 | 20-40 | 0.3 | bad | very good | excellent | average | excellent | poor |
| Fe—50% Ni « transformer » | residual | 0.2 | 2-5 | 1 | average | poor | very good | very good | good | average |
| Fe—50% Ni « transformer » | 900 μm | 0.2 | 2-5 | 1 | average | poor | good | good | good | average |
| Fe—50% Ni 'cubic' texture {100}<001> | 0.2 mm | 0.2 | 5-10 | 1 | average | very good | average | average | good | average |
| Fe—65% Ni 'cubic' texture {100}<001> | 0.2 mm | 0.25 | 1-3 | 0.8 | average | very good | good | good | good | average |
| Fe—80.1% Ni—5% Mo (Mu-metal) | 0.05 mm | 0.2 | 0.5-1 | 0.4 | bad | very good | very good | very good | good | poor |
| Fe—36% Ni (INVAR) of 'cubic' texture {100}<001> | 0.18 mm | 0.2 | 5-10 | 0.8 | average | very good | good | good | good | good |
| Fe—29.5% Ni | 0.15 | 0.2 | 7-11 | 0.3 | bad | good | very good | very good | good | good |

We consider here the quality of alloy Fe-50% Ni, called "transformer" quality. This has been known from the prior art for a long time, and corresponds to a metallurgical range with a final microstructure of coarse grains (from a few hundred μm to a few mm), with different textured components of average amplitude but not presenting any significant cubic texture component and consequently having low magnetic losses on circuits in C or E, and with apparent magnetostriction at saturation of the order of 10-20 ppm. A description of such alloys may be found especially in the references "Alloy 48" published by Engineering Alloys Digest, Inc. Upper Montclair, N.J., June 1975, and F. J. G, Landgraf, "Effect of annealing on Magnetic Properties of Fe-47.5% Ni alloy", J. Mater, Eng. (1989) Vol. 11, No. 1, pp. 45-49.

In a configuration variant, which will also be among those considered in the tests that will be described (Tables 3 and 4), the superposed plates forming the core may be cut into an "eight" shape. This gives a core of a general shape that is identical to that shown in FIG. 1, but without an air gap, so not in accordance with the invention.

The invention is therefore based on the use, as sole material or as the main constituent material of the core, of a cubic texture austenitic FeNi alloy, preferably with a high saturation magnetization, such as alloys containing from 30 to 80% Ni, preferably 40 to 60% Ni, and at most 10%, better at most 2% of other elements than Fe and Ni. The inventors have, in fact, discovered with surprise that the use of such materials under the conditions of the invention significantly reduces the magnetostriction noise, whereas the true magnetostriction coefficients of these materials nevertheless remain high (for example $\lambda_{100}$>20 ppm).

This exemplary implementation of the invention will be better described by a number of specific examples below, which consider different thickness ep1 and ep2 for the stacks made with the first and the possible second material, respectively, and for different magnetic reference materials, for producing a magnetic circuit that is:
either cut "in an uninterrupted eight", and therefore without an air gap (so not in accordance with the invention),
or, in accordance with one embodiment of the invention, provided with a residual air gap (Res.) ε of the order of 1 μm between the E's forming the "eight";
or achieved by putting two E stacks face to face with provision of a calibrated air gap ε from a few microns or tens of microns (or up to 1 mm) between the two E's (example of FIG. 1).

In cases where several materials are used, two values have been indicated for this air gap ε, which may be different, and successively correspond to the air gap $\varepsilon_1$ separating the E or E+I at the level of the stacks made with the first material, and at the air gap $\varepsilon_2$ separating E or E+I at the stacks made with the second material. The column "Config." (configuration) specifies which core morphology was adopted for each test.

The results are given for an on-board three-phase transformer having the following characteristics:
fundamental frequency: 360 Hz;
transformer magnetising primary current: I1=115 A;
primary voltage V1 and secondary V2 of the transformer: V1=V2=230V,
apparent electrical power transformed by the transformer: P=46 kVA approximately.

The geometry of the circuit is fixed by the parameters a, b and c fixed in the example of FIG. 8 as:
a (width of each horizontal and vertical branch of the eight or E)=20 mm;
b (interval between each horizontal branch of the eight or E)=50 mm;
c (length of each horizontal branch of the eight or E, with the exception of the common part between this horizontal branch and the vertical branch to which it is attached)=60 mm.

It is imperative to electrically isolate at least one of the faces, better the two faces, of the FeNi strips or plates with a thickness of insulating material from a few μm up to, preferably, 5-10 μm, which may result in:
either in a deposit of varnish, or organic resin, with or without mineral filler, deposited after cutting the plate and texturing annealing;

or an oxidizing annealing on the plates after texturing annealing, producing the formation of an oxidized layer on the surface of the plates;

or a metered dusting or the deposition of a suspension of oxide particles (alumina, magnesia, lime . . . ) in a liquid and its additives, such as, for example, milk of magnesia (water+glue+fine powder of MgO. particles from a few μm in diameter);

or the deposition on the FeNi alloy strip of a layer capable of creating electrical insulation and resistant to high annealing temperatures (typically 900-1000° C.), for example the deposition of certain organometallic compounds, such as Mg methoxide, forming slightly sticky MgO. after a high temperature annealing of the already assembled transformer core, the particles remaining stuck between the plates, guaranteeing a calibrated air gap between the plates in the examples in Table 2, both sides of the plates were coated with 2 μm Mg methoxide.

As has been stated, the insulation could also be ensured by the interposition of insulating non-magnetic plates in the stacks between the successive plates composing these stacks.

This insulation is also practiced, in the same manner, on the high Js material plates of the second stack.

It is well known to those skilled in the art that if the work induction is lowered to reduce the noise and the inrush effect, then the magnetic section (and hence the magnetic circuit weight) must be increased to maintain the same induced voltage V2 of 230V, and thus guarantee the transformed power P. The specification of this low-noise transformer is an inrush index In of less than 0.8 and noise less than or equal to a limit that may be between 55 and 80 dB depending on the location of the transformer in the aircraft.

In the reference examples, the first material is either FeSi or FeCo, and no second material is added.

The results of the tests are shown in Table 3, The results satisfying the aforementioned specifications are underlined.

It is noted that the invention aims to obtain high-performance transformers having the following characteristics.

They have a the greatest weight density power possible, typically at least equal to 3 kVA/kg, and preferably greater than 4 kVA/kg, or even greater than 5 kVA/kg at 400 Hz. The weights considered are those of the magnetic core alone.

The noise of magnetostrictive origin of the transformer is less than or equal to a limit between 55 and 80 dB depending on the specifications. Some examples according to the invention actually have a noise of less than 55 dB, and the corresponding transformers may therefore be placed in a cockpit.

They have an inrush index of 0.8 at most.

These characteristics are obtained with a core weight of up to 16 kg.

It follows from the tests below that it is necessary to use, in order to form the core, a strip or plate of FeNi alloy of small thickness (typically 0.2 mm) and cut elements which are derived therefrom, characterized by low magnetic losses in sinusoidal induction waves originating from the magnetic core: less than 20 W/kg at 400 Hz, preferably less than 15 W/kg, and more preferably less than 10 W/kg, for a maximum induction of 1 T.

The FeNi alloy should contain from 30 to 80% Ni, preferably from 40 to 60% Ni, and at most 10% in total of alloying elements such as Cr, Si, Ai, Zr, Mo, W, V, Nb, Cu, Mn and various impurities resulting from the preparation, preferably at most 2%.

The FeNi plates have an acute {100} <001> cubic texture component (more than 80% of the grains by volume or surface). The grain is considered cubic when its disorientation is at most 20° relative to the ideal orientation, preferably at most 10°, better at most 5°.

The FeCo (FeCo27 or FeCo50V2) and FeSi 3% Si plates used either in reference examples or as second material added in examples according to the invention may be of any texture, as they are used only for their high saturation magnetization Js and, possibly, their low work induction BE which limits their magnetostriction. In the present cases, the FeCo27 of Example 1 has a texture with 43% of component {110} <001> so-called Goss, 38% of random texture components, the remainder comprising textures according to other minor components, with some % for each of them, the FeCo27 of Example 12B has a Goss texture component of 10% and a random texture for the remainder, the FeCo49V2 of the various Examples 2 to 6 have 14.5% of component {001} <110>, 14% of component {112} <110>, 13.5% of component {111} <110>, 26% of component {111} <112> and 32% of random texture components. FeSi3 have for some a structure with non-oriented (N.O.) grains, therefore completely random (Examples 7 to 10) and for others (Examples 11-12) a grain oriented (G.O.) structure, i.e. Goss texture {110} <001> as presented previously.

The plates forming the core are cut into elements in the form of E, I, or C, or any other shape whose sides are straight and perpendicular or parallel to each other. The sides of the plates are substantially perpendicular or parallel to either the rolling direction of the DL strip and the direction DT perpendicular to the rolling direction DL The crystallographic plane (100) of the ideal "cubic" orientation is shown in FIG. 7 as being perfectly parallel to the rolling plane (which is the plane of the E stack 53) but it is possible to accept up to 20° of disorientation ω between these two planes so that the surprising effect is significant. Preferably this disorientation is at most 10°, more preferably at most 5°. Similarly one can accept up to 20° of disorientation α between the axes [001] or [010] and respectively DL or DT, so that the surprising effect is significant, Preferably, this disorientation α is at most 10°, more preferably at most 5°.

The apparent magnetostriction for a maximum induction of 1.2 T, denoted $\lambda_s^{1.2\ T}$, is less than 5 ppm, preferably less than 3 ppm, preferably 1 ppm, when the measurement is carried out on an elongated rectangular sample (of the Epstein type frame or typically a plate of 100×10 mm²), the field being applied in the "long" direction of the sample (in other words the direction of the long sides of the rectangle formed by the sample) and this direction being parallel to the rolling direction DL.

Also, the apparent magnetostriction for a maximum induction of 1.2 T, denoted $\lambda_s^{1.2}$, is less than 5 ppm, preferably less than 3 ppm, preferably 1 ppm, when the measurement is performed on an elongated rectangular sample (of the Epstein frame type or typically of a plate of 100×10 mm²), the field being applied in the "long" direction of the sample and this direction being parallel to the transverse direction DT which is the direction perpendicular to the rolling direction DL and located in the lamination plane.

Finally, the apparent magnetostriction for a maximum induction of 1.2 T, denoted $\lambda_s^{1.2\ T}$, is less than 10 ppm, preferably less than 8 ppm, preferably 6 ppm, when the measurement is performed on an elongated rectangular sample (of the Epstein frame type or typically of a plate of 100×10 mm²), the field being applied in the "long" direction of the sample and this direction being parallel to the intermediate direction at 45° of the rolling direction DL and transverse direction DT, and lying in the same plane as DL and DT.

At least 80% of the grains, counted in volume or surface, which amounts to the same, are of "cubic" orientation {100} <001> with a maximum of average disorientation ω of the distribution of the crystallographic orientations of 20° relative to the ideal orientation {100} <001>, It should be understood that ω is more precisely the average of the three disorientations of the CUBIC texture component, each measured around DL, DT or DN.

The magnetic remanence $B_r$ of the magnetic circuit is adjustable to a more or less low value through the various air gaps distributed between the cut parts: either a residual air gap, i.e. only resulting from the cutting and setting edge to edge of the core elements (in this case, it may be of the order of 1 or a few μm), or, preferably, a controlled gap (for example by means of shims) as well between the stacked elements (in the direction DN) than between the edges of elements assembled in E+I, E+E, C+C, C+I ..., thus in their rolling planes. Specific examples of configurations of magnetic parts (stacked alternately, totally, partially or not at all) and air gap values are given below in the text.

Regarding the denominations of the various air gaps in question, it is necessary to specify the following.

The natural axes of symmetry of a transformer core composed of E, I or C elements, namely:
  the X axis parallel to the legs of the E or C, and which corresponds to the rolling direction DL;
  the Y axis parallel to the E or C backs and to the principal directions of the I's and corresponding to the direction DT perpendicular to DL;
  the Z axis normal to the plane of the plates cut in E, I or C and defining an orthogonal reference with the X and Y axes.

The "transformer core plane" is defined by the plane containing the X and Y axes.

It should be understood that, in the above reasoning, DT and DL could very well be exchanged by matching them to X and Y respectively, as is also indicated on the drawing board 1 where two marks corresponding to each of these reasonings are shown.

The air gap zones are volumes, based on facing surfaces that each delimit a part in E, I, C . . . . These air gap volumes are very thin because their thickness is strictly speaking "the air gap", namely the distance separating the two opposite surfaces.

The air gap(s) is/are defined based on base surfaces X—Z or Y—Z which are the end cross-sections (at the ends) of the magnetic parts cut into E, I or C of the transformer. The gap ε is therefore the measurement of the average spacing, along the Y or X axes respectively, between the two surfaces facing the ends of two parts. These air gaps s may take two different values $\varepsilon_1$ and $\varepsilon_2$ in the case of the use (not mandatory) of two different materials in the core as has been stated above. Typically, these air gaps ε range from a "residual" thickness (a few μm) to a thickness controlled by the interposition of shims or non-magnetic plates of the order of a few tens to a few hundreds of μm, or even of the order of mm.

The air gap(s) δ are defined by using base surfaces X-Y which are the main surfaces of magnetic parts cut into E, I or C of the transformer; and the air gap δ is therefore the measurement of the average spacing between two facing surfaces inside the stacks or between two stacks, therefore in the direction 2. These air gaps δ are produced by the interposition of a non-magnetic plane material between pieces cut in E, I, C for example, or between stacks of such cut pieces. These parts or stacks of parts may or may not be arranged head-to-tail. An air gap δ may take a value $\delta_1$ between two cut parts of the same stack of cut parts of the same shape, dimensions and orientation, and a value $\delta_2$ between two superposed stacks of cut parts of shapes and/or different orientations, We can play on this possible difference between $\delta_1$ and $\delta_2$ to reduce the remanent induction $B_r$. The values of δ are typically in the same order of magnitude as those of ε.

Figure 10:
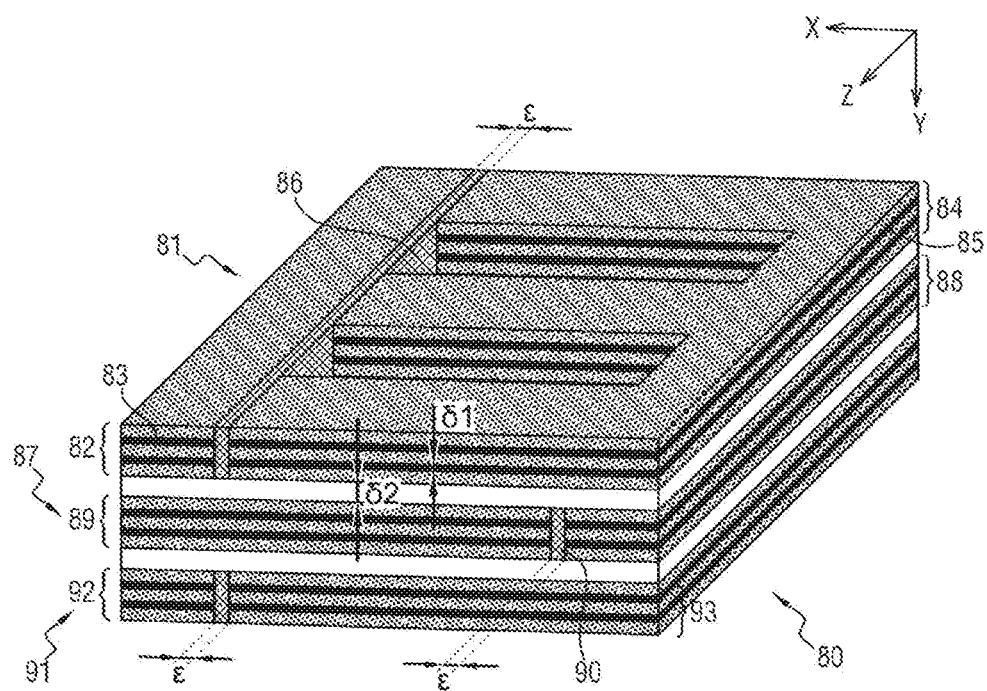
FIG. 10 shows in perspective a variant of a core configuration consisting of a superposition of three layers of plate stacks, the plates being arranged in E+I inside each layer of stacks, and each layer of stacks being arranged head-to-tail with respect to the adjacent layer(s)

The air gaps ε, δ1 and δ2 are highlighted in FIG. 10.

It may also be interesting to modulate the values of the air gaps δ according to whether one is in the main material with low magnetostriction of the core or in the optional material with high Js.

The following examples 1 to 5 and 7 to 9, and also examples 13, 17, 20, 23, 27 are made entirely from plate cut into one eight-shaped part. In this case, there is only one possibility for stacking the eight-shaped parts on each other. The only modifications that could be made to the magnetic circuit once the desired number of eight-shape parts is achieved, are the introduction or not of a substantial air gap of the type of air gaps δ previously described (by means of shims, non magnetic spacers . . . ) between all the eight-shaped parts or some of them.

Although this is not shown in Table 3 below, the inventors have tried to add gaps between all or some of the eight-shaped parts: the results of the aforementioned examples have not changed at all. The non-interest of the solutions with eight-shaped parts, having at least 50% of the parts cut into a single eight-shaped part but without ε type air gap highlighted below from the results reported in Table 3, is therefore just as much the same for these same examples as if they had used δ type air gap spacers between the eight-shaped parts. An air gap is effective on magnetic cores in the general form of eight according to the invention in that if it divides the eight into two blocks in E, one E block and one I block, two E blocks each formed of two blocks of juxtaposed C, or the like, facing each other.

In some cases of the examples below (Tables 3, 4 and 5) using cut parts in E or E+I or E formed by two contiguous C (Examples 6, 10-12B, 14-16, 18, 18bis, 18ter, 19, 21, 22, 24-26), these are superposed in a configuration 1 called "series": in this case, the E, I or C are always superposed on an E, I or C, which gives at the end, magnetic sub-circuits formed of E, or I or C stacks, which are placed face to face with a gap ε, at least residual, between these two parts; this corresponds to the cases shown in FIGS. 7 and 8; a shim, the thickness of which is noted in Table 3, examples and references below, which defines the width of the gap between these stacks, may be inserted between the stacks at E, I or C facing each other; in the examples below, no such shim has been inserted inside each stack of E, I or C, and the gaps between the plates inside these stacks remain residual (typically a few μm). All the examples in Table 3 show this "series" configuration.

In some examples of Tables 4 and 5, a so-called "parallel" configuration 2 (noted in Tables 4 and 5) is used: in this case, the plates in E or i, or in C, etc. are stacked up but not by necessarily putting themselves in the same position as the previous plate of the stack: thus we meet at least one alternation which is "head-to-tail", this expression having the meaning seen with reference to FIG. 3. In the case of the examples of Table 3, no air gap was set between the branches of E and i belonging to two successive levels of a stack: the corresponding air gaps remain residual.

In Tables 3, 4 and 5, the values of noise, inrush index and total weight of the core which are considered as at least acceptable for an implementation of the invention in the case of a three-phase power transformer of the order of 46 kVA, are underlined. An example given in accordance with the invention must therefore be acceptable on these three points, since it is considered that a noise of less than 80 dB falls into this category, the preferred maximum of 55 dB applying to an on-board transformer that is particularly suitable for installation in the cockpit itself. To be acceptable, the inrush index must be less than 0.8, while the total weight must be less than or equal to 17 kg.

TABLE 3

Test results of various core designs

| Ex. | Config. | Material(s) and cutting form | Air gaps ε, or ε1 and ε2 (μm) | ep1 (mm) | ep2 (mm) | Mat. 1 $B_r$ (T) | Mat. 1 $B_r$ (T) | Mat. 2 $B_r2$ (T) | dΦ/dt (V) | Noise (dB) |
|---|---|---|---|---|---|---|---|---|---|---|
| 1 Ref | In 8 | FeCo27 in 8 | | 40 | 0 | 2 | 0.95 | — | 231.6 | 108 |
| 2 Ref | In 8 | FeCo50V2 in 8 | | 40 | 0 | | 1.30 | — | 231.6 | 117 |
| 3 Ref | In 8 | FeCo50V2 in 8 | | 53 | 0 | 1.5 | 0.90 | — | 230.2 | 100 |
| 4 Ref | In 8 | FeCo50V2 in 8 | | 80 | 0 | 1 | 0.65 | — | 231.6 | 82 |
| 5 Ref | In 8 | FeCs50V2 in 8 | | 265 | 0 | 0.3 | 0.195 | — | 230.2 | <u>65</u> |
| 6 Ref | Series | FeCo50V2 in 2 × E + ε | 200 | 80 | 0 | 1 | 0 | — | 231.6 | 87 |
| 7 Ref | In 8 | FeSi3 NO in 8 | | 53 | 0 | 1.5 | 1.05 | — | 230.2 | 96 |
| 8 Ref | In 8 | FeSi3 NO in 8 | | 72.5 | 0 | 1.1 | 0.77 | — | 230.9 | 87 |
| 9 Ref | In 8 | FeSi3 NO in 8 | | 265 | 0 | 0.3 | 0.21 | — | 230.2 | <u>58</u> |
| 10 Ref | Series | FeSi3 NO in 2 × E + ε | 50 | 72.5 | 0 | 1.1 | 0 | — | 230.9 | 90 |
| 11 Ref | Series | FeSi3 GO in 2 × E + ε | 50 | 53 | 0 | 1.5 | 0 | — | 230.2 | 91 |
| 12 Ref | Series | FeSi3 GO in 2 × E + ε | 50 | 72.5 | 0 | 1.1 | 0 | — | 230.9 | 82 |
| 12B Ref | Series | FeCo27 in 2 × E + ε | 50 | 40 | 0 | 2 | 0.2 | — | 231.5 | 107 |
| 13 Ref | In 8 | FeNi50 non textured in 8 | | 72.5 | 0 | 1.1 | 0.8 | — | 230.9 | <u>75</u> |
| 14 Ref | Series | FeNi50 non textured in 2 × E + ε | 180 | 72.5 | 0 | 1.1 | 0.06 | — | 230.9 | 82 |
| 14B Ref | Series | FeNi50 non textured in 2 × E + ε | 180 | 114 | 0 | 0.7 | 0.035 | — | 231.0 | <u>54</u> |
| 15 Inv | Series | FeNi50 CUB ω = 15° in 2 × E + ε, | 180 | 72.5 | 0 | 1.1 | 0.06 | — | 230.9 | <u>62</u> |
| 16 Inv | Series | FeNi50 CUB ω = 7° in 2 × E + ε, | Res. | 72.5 | 0 | 1.1 | 0.06 | — | 230.9 | <u>55</u> |
| 17 Ref | In 8 | FeNi50 CUB ω = 7° in 8 | | 72.5 | 0 | 1.1 | 1.4 | — | 230.9 | <u>47</u> |
| 18 Inv | Series | FeNi50 CUB ω = 7° in 2 × E + ε, | 200 | 79.5 | 0 | 1 | 0.05 | — | 230.2 | <u>44</u> |
| 19 Inv | Series | FeNi50 CUB ω = 7° + FeSi N.O. in 2 × E + ε, | 180 180 | 72 | 6 | 1.1 | 0.055 | 0.1 | 230.7 | <u>47</u> |
| 20 Ref | In 8 | FeNi50 CUB ω = 7° + FeSi NO. in 8 | | 71.6 | 10 | 1.1 | 1.45 | 0.1 | 230.9 | <u>46</u> |
| 21 Inv | Series | FeNi50 CUB ω = 7° + FeCo, in 2 × E + ε, | 200 200 | 61 | 6 | 1.3 | 0.065 | 0.1 | 231.3 | <u>49</u> |
| 22 Ref | Series | FeNi50 CUB ω = 7° + FeCo, in 2 × E + ε, | 200 200 | 57 | 6 | 1.39 | 0.07 | 0.1 | 231.1 | <u>49</u> |
| 23 Ref | In 8 | FeNi50 CUB ω = 7° + FeCo, in 8 | | 57 | 5 | 1.39 | 1.45 | 0.1 | 230.8 | <u>49</u> |
| 24 Inv | Series | FeNi50 CUB ω = 7° + FeCo, in 2 × E + ε | 200 200 | 71.6 | 10 | 1.1 | 0.055 | 0.1 | 230.9 | <u>51</u> |
| 25 Inv | Series | FeNi50 CUB ω = 7° + FeCo, in 2 × E + ε, | 300 200 | 56.7 | 10 | 1.39 | 0.07 | 0.1 | 231.1 | <u>51</u> |

TABLE 3-continued

Test results of various core designs

| | | | | | | | | | | | |
|---|---|---|---|---|---|---|---|---|---|---|---|
| 26 Inv | Series In 8 | FeNi50 CUB ω = 7° + FeCo, in 2 × E + ε, | 300 200 | 53.8 | 15 | 1.4 | 0.07 | 0.3 | 231.1 | <u>54</u> |
| 27 Ref | | FeNi50 CUB ω = 7° + FeCo, in 8 | | 50.2 | 15 | 1.5 | 1 | 0.3 | 231.0 | <u>59</u> |

| Ex. | Inrush index | Weight (kg) | | Total weight (kg) | P-tri (kVA) | P-tri/M (kVA/kg) | $J_s1$ (T) | $J_s2$ (T) | Vol. % Mat1/ Mat2 |
|---|---|---|---|---|---|---|---|---|---|
| | | Mat 1 | Mat 2 | | | | | | |
| 1 Ref | 2.57 | 8.0 | 0 | <u>8.0</u> | 46.14 | 5.72 | 2.38 | 0 | 0 |
| 2 Ref | 2.95 | 6.4 | 0 | <u>6.4</u> | 46.14 | 7.22 | 2.35 | 0 | 0 |
| 3 Ref | 1.62 | 8.4 | 0 | <u>8.4</u> | 45.85 | 3.61 | 2.35 | 0 | 0 |
| 4 Ref | <u>0.30</u> | 12.7 | 0 | <u>12.7</u> | 46.14 | 3.61 | 2.35 | 0 | 0 |
| 5 Ref | <u>−1.56</u> | 42.2 | 0 | 42.2 | 45.85 | 1.09 | 2.35 | 0 | 0 |
| 6 Ref | <u>−0.35</u> | 12.7 | 0 | <u>12.7</u> | 46.14 | 3.61 | 2.35 | 0 | 0 |
| 7 Ref | 2.02 | 8.4 | 0 | <u>8.4</u> | 45.85 | 5.45 | 2.03 | 0 | 0 |
| 8 Ref | 0.94 | 11.5 | 0 | <u>11.5</u> | 45.99 | 3.99 | 2.03 | 0 | 0 |
| 9 Ref | <u>−1.22</u> | 42.2 | 0 | 42.2 | 45.85 | 1.09 | 2.03 | 0 | 0 |
| 10 Ref | <u>0.17</u> | 11.5 | 0 | <u>11.5</u> | 45.99 | 3.99 | 2.03 | 0 | 0 |
| 11 Ref | 0.97 | 8.4 | 0 | <u>8.4</u> | 45.85 | 5.45 | 2.03 | 0 | 0 |
| 12 Ref | <u>0.17</u> | 11.5 | 0 | <u>11.5</u> | 45.99 | 3.99 | 2.03 | 0 | 0 |
| 12B Ref | 1.82 | 8.0 | 0 | <u>8.0</u> | 46.1 | 5.70 | 2.00 | 0 | 0 |
| 13 Ref | 1.40 | 12.0 | 0 | <u>12.0</u> | 45.99 | 3.84 | 1.60 | 0 | 0 |
| 14 Ref | <u>0.66</u> | 12.0 | 0 | <u>12.0</u> | 45.99 | 3.84 | 1.60 | 0 | 0 |
| 14B Ref | <u>−0.17</u> | <u>18.8</u> | 0 | 18.8 | 46.02 | 2.44 | 1.60 | 0 | 0 |
| 15 Inv | <u>0.66</u> | 12.0 | 0 | <u>12.0</u> | 45.99 | 3.84 | 1.60 | 0 | 0 |
| 16 Inv | <u>0.66</u> | 12.0 | 0 | <u>12.0</u> | 45.99 | 3.84 | 1.60 | 0 | 0 |
| 17 Ref | <u>1.40</u> | 12.0 | 0 | <u>12.0</u> | 45.99 | 3.84 | 1.60 | 0 | 0 |
| 18 Inv | <u>0.45</u> | 13.1 | 0 | <u>13.1</u> | 45.85 | 3.50 | 1.60 | 0 | 0 |
| 19 Inv | <u>0.47</u> | 11.9 | 0.77 | <u>12.7</u> | 45.96 | 3.63 | 1.60 | 2.35 | 10.7 |
| 20 Ref | 1.58 | 11.8 | 1.54 | <u>13.4</u> | 46.00 | 3.44 | 1.60 | 2.35 | 19.8 |
| 21 Inv | <u>0.78</u> | 10.1 | 0.99 | <u>11.1</u> | 40.08 | 4.16 | 1.60 | 2.35 | 14.3 |
| 22 Ref | 0.93 | 9.4 | 0.99 | <u>10.4</u> | 46.04 | 4.42 | 1.60 | 2.35 | 15.1 |
| 23 Ref | 2.24 | 9.4 | 0.83 | <u>10.2</u> | 45.98 | 4.49 | 1.60 | 2.35 | 12.8 |
| 24 Inv | <u>0.31</u> | 11.8 | 1.65 | <u>13.5</u> | 46.00 | 3.41 | 1.60 | 2.35 | 19.8 |
| 25 Inv | <u>0.74</u> | 9.4 | 1.65 | <u>11.0</u> | 46.03 | 4.18 | 1.60 | 2.35 | 23.4 |
| 26 Inv | <u>0.61</u> | 8.9 | 2.48 | <u>11.4</u> | 46.03 | 4.05 | 1.60 | 2.35 | 33.1 |
| 27 Ref | 1.44 | 8.3 | 2.48 | <u>10.8</u> | 46.02 | 4.27 | 1.60 | 2.35 | 34.5 |

(NB: $B_r$ inductions are measured on the major hysteresis cycle at saturation)

It will now be shown that the E+I or C configurations are equally suitable for providing the advantages of the invention. Starting from the above example 18 in E+E+type ε air gap, we compare in Table 4 the E+1 configurations (of the type of FIG. 4) also of a three-phase transformer type (section conservation) and that in 2×E with E=2C contiguous (of the type of FIG. 6) type single-phase transformer (winding on the central leg), These examples do not include high Js material 2, but only the material 1 of low magnetostriction.

For the three phase Example 18 (E+E), the geometry of the circuit is fixed by the parameters a, b and c, as in the example of FIG. 1: a (branch width of E and back of the E)=20 mm, b (interval between branches of the E)=50 mm, c (length of the branches of the E)=60 mm.

For the three-phase Example 18bis (E+I), the geometry of the circuit is fixed by the parameters a, b and c, as in the example of FIG. 4: a (branch width of E or I or back of the E) 20 mm, b (branch interval of E)=50 mm, c (branch length of E)=120 mm.

For single-phase Example 18ter (E=2C+E=2C), the geometry of the circuit is fixed by the parameters a, b and c as in the example of FIG. 6: a (branch width of C)=20 mm which amounts to constituting: a central leg of E=2C of 2×20=40 mm, b (interval between the branches of C)=50 mm, c (length of the branches of C)=60 mm.

For three-phase Example 18quater (in alternating E+I), the same material as for 18bis is used, but in configuration of E+I stacks alternating with each layer, with residual air gaps between E and I as well as between each layer of E+I. It is therefore a configuration in parallel (∥).

TABLE 4

Comparisons between the results of Example 18 and configurations derived from Example 18

| Ex. | Type of Transformer | Config | Material in cut form | Air gap ε (μm) | ep1 (mm) | Mat. 1 $B_t$ (T) | $B_r$ (T) | dΦ/dt (V) | Noise (dB) |
|---|---|---|---|---|---|---|---|---|---|
| 18 Inv | three-phase | Series | FeNi50 CUB ω = 7° in 2 in column of E + ε | 200 | 79.5 | 1 | 0.05 | 230.18 | <u>44</u> |
| 18bis Inv | Three-phase | Series | FeNi50 CUB ω = 7° in column E + column I + ε | 200 | 79.5 | 1 | 0.05 | 230.18 | <u>43.5</u> |
| 18ter Inv | single-phase | Series | FeNi50 CUB ω = 7° in 2×(E = 2 column of C) + ε | 200 | 79.5 | 1 | 0.05 | 460.3 | <u>44.5</u> |
| 18quater Inv | Three-phase | ∥ | FeNi50 CUB ω = 7° in E + I alternating + ε residual | residual | 86.5 | 0.92 | 0.55 | 230.41 | <u>49</u> |

| Ex. | Inrush index | Weight (kg) Mat 1 | Total weight (kg) | P-tri (kVA) | P-tri/M (kVA/kg) | Js1 (T) | Js2 (T) |
|---|---|---|---|---|---|---|---|
| 18 Inv | <u>0.45</u> | 13.1 | 13.1 | 45.85 | 3.49 | 1.60 | 0 |
| 18bis Inv | <u>0.45</u> | 13.1 | 13.1 | 45.85 | 3.49 | 1.60 | 0 |
| 18ter Inv | <u>0.45</u> | 26.3 | 126.3 | 53 | 2.02 | 1.60 | 0 |
| 18quater Inv | <u>0.79</u> | 14.3 | 14.3 | 45.89 | 3.21 | 1.60 | 0 |

CUB = "cubic" texture {100} <001>;
ε = calibrated air gap;
P-tri: apparent power three-phase (V.A)

It can be seen that Examples 18a and 18b have performances quite comparable to those of Example 18, and which are, like the latter's, in accordance with the invention. Example 18ter leads to a heavier core, but it remains acceptable.

For Example 18quater, there results from its configuration a remanent induction $B_r$ of the major hysteresis cycle of 0.8 T, and if we then want to reduce the inrush to the admissible limit (0.8), then the induction $B_t$ must be lowered in nominal mode to 0.8 T and the section of material also increased in order to keep the secondary voltage delivered and the apparent power transformed. This results in an increase in weight of the magnetic core up to 16.5 kg, which is still acceptable, while the noise emitted is well below the tolerated threshold, it can therefore be seen that even with a fairly high value of Be and at the cost of an acceptable increase of a few kilograms, it is still possible to benefit from the invention with a low emitted noise and an acceptable inrush index. However, we see that it is interesting, in order to minimize the weight, to try to reduce the $B_r$ of the magnetic core: the examples below show different ways to achieve this.

Figure 9:
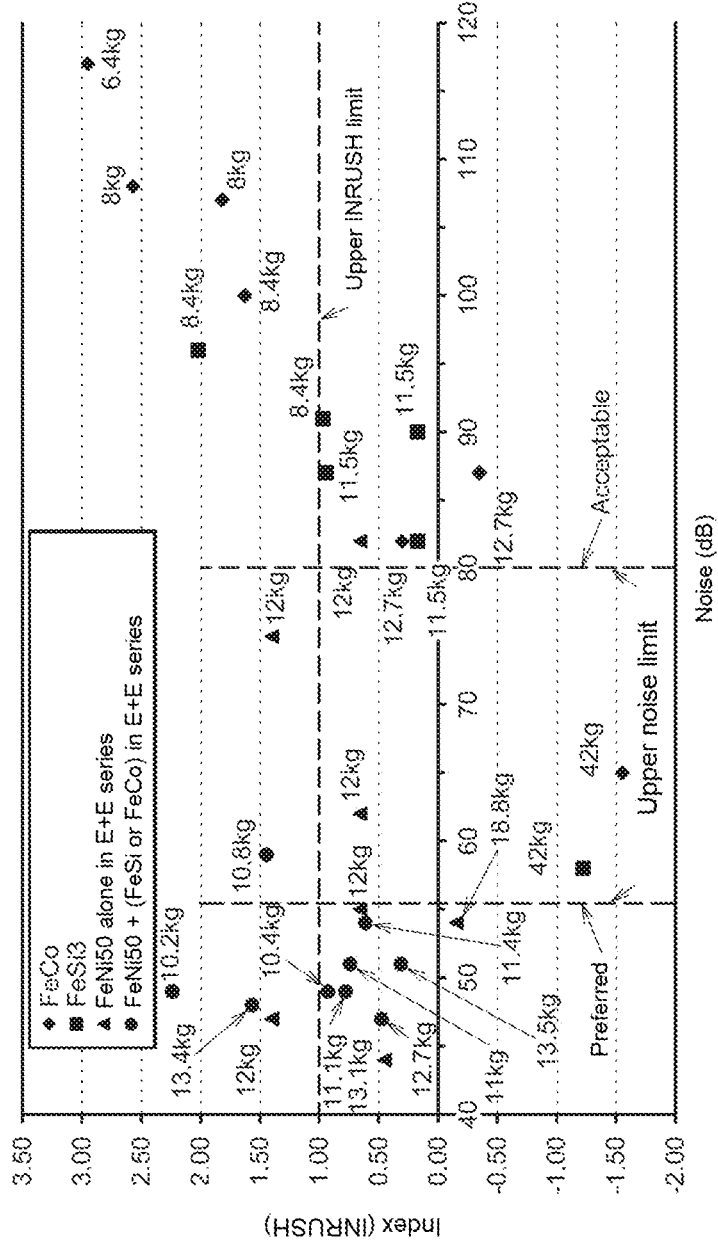
FIG. 9 shows how the examples of table 3 are located in a diagram showing their "inrush noise index" pairs and indicating the weight of the corresponding cores.

FIG. 9 shows a diagram in which the various examples of Table 3 are presented. On the abscissa is the noise emitted by the transformer, while on the ordinate is the inrush index. Dotted lines delimit the noise and inrush domains corresponding to the objectives (imperative and preferred for the noise) targeted by the invention. The weights of the corresponding cores were also noted, and materials were identified in various ways.

The analysis of the results makes it possible to reach the following conclusions.

The exclusive use of the usual non-textured or textured alloys used in onboard transformers, namely FeCo alloys with 27% Co, or 50% Co, and 2% V, or N.O. or G.O. Fe-3% Si electrical steels, causes a very large noise if the work induction is high (typically, Be of the first material greater than 1 T), while the weight of the magnetic circuit is low (Examples 1 to 3). It is only with a work induction of 1 T (Example 4) that the effect of inrush weakens (it is 1.3), without, however, being able to respect the specifications of an inrush index of 0.8 at most. The noise levels reached in Examples 1 to 3 (100 to 117 dB) are prohibitive, for any onboard use requiring spoken communication between people, without the aid of technical equipment (namely microphones and headsets equipping current cockpits), The noise level of Example 4, although smaller (82 dB), still remains above the acceptable threshold of 80 dB for onboard use.

To achieve lower magnetostriction levels, it only remains, in this configuration case and for these material choices, to further reduce the work induction. This is shown in Example 5 where, by lowering the work induction to 0.3 T, an acceptable noise level is obtained (65 dB versus the optimally sought 0.55 dB), but the magnetic circuit weight has more than tripled (42 kg), which is also prohibitive in aircraft. This solution is therefore not satisfactory.

All reference examples 1 to 5 use a circuit configuration with superposed plates cut in an 8, without an air gap. The transition to a structure cut as a double E in accordance with FIG. 1 with a calibrated air gap of 200 µm of reference Example 6 makes it possible to further reduce the inrush effect compared to example 4, but the noise is somewhat degraded. This modification alone does not make the FeCo alloy magnetic circuit more acceptable as a "low noise transformer".

On the other hand, the use of Non Oriented Fe-3% Si electric steel (N.O., i.e., without marked texture other than that resulting, in an uncontrolled way, from the rolling and annealing required to reach the final thickness), gives results very similar to those of the examples using FeCo27 alloys. Reference examples 7, 8 and 9, eight-shaped section without an air gap, show that, by a progressive reduction of the work induction $B_t$, the magnetic circuit achieves a low weight (Example 7: 8.4 kg) and noise (96 dB) with a strong inrush effect (index>2) at (Example 9) a very high weight for $B_t$=0.3 T (42 kg) with a relatively low noise emitted almost at the optimum limit (58 dB) and a very low inrush effect (<0). Whether because of the high noise or high weight imposed by the need to work at a low $B_t$ induction to obtain low noise and inrush, these examples can not be satisfactory for the "low noise on-board transformer" application.

The comparison of reference examples 8 and 10 shows the effect of a double cut E. As in the examples using FeCo, this cutting mode improves the inrush effect but degrades the noise emitted. This does not change the conclusions about the impossibility of applying N.O. FeSi3 to a low noise magnetic circuit of an onboard transformer.

Reference Examples 11 and 12 describe the use of 3% Si and grain-oriented (G.O. FeSi 3) electrical steel in a double-E structure with a calibrated air gap of 50 µm, for average inductions of 1 and 1.5 T, in order to retain a low on-board weight (8-12 kg). However, the use of such a type of texture, called Goss {110} <001>, only slightly improves the noise emitted: see the comparison of examples 10 (N.O.) and 12 (G.O.) with a reduction noise of only 8 dB. This does not achieve a reduced weight and low emitted noise. It can thus be seen here that any textured material is not necessarily of interest in itself to significantly reduce the noise emitted by a cut magnetic circuit, even if the structure comprises an air gap.

Examples 12 and 12 B have the same magnetic core configuration made up of two stacks of E-cut parts facing each other, separated by the same calibrated air gap of 50 µm. These two examples make it possible to compare the use of two different materials, as they are both monomaterial. For Example 12, a G.O. (grain orientated) FeSi 3% material known for its very low magnetostriction according to DL and its great magnetostriction according to DT is used; it follows that for a transformer having two orthogonal main directions of the magnetic flux in the plane of the pieces in E, C or I, the magnetostriction deformations will be high and can only be reduced by reducing the level of induction. This is done in example 12 with a value $B_t$=0.1 T (55% of Js), while a low value of remanence $B_r$ is provided by the air gap, $B_r$=0.1 T. Even at this level of reduced work induction of 1.1 T, the noise still remains quite strong (82 dB), but nevertheless significantly reduced by 9 dB compared to Example 11. On the other hand, the low value of $B_r$ and the high value of Js, allow a low inrush coefficient, and would be compatible with the specifications of the transformer. The resulting weight of 11.5 kg is permissible for the application, because of the drastic reduction of work induction $B_r$ that had to be compensated by an increase of the section of the core in the same proportions in order to maintain the transformed electrical power. The noise is too high (27 dB too high compared to the preferred upper limit and 2 dB too high above the acceptable upper limit), however, so this example does not comply with the specifications, even in their least demanding variant for magnetostrictive noise.

Example 12B replaces G.O. FeSi3% by a 27% Fe—Co alloy known to be the magnetic alloy having the highest saturation magnetization (2.38 T), the magnetically soft FeCo alloys being historically those used in onboard electrical engineering to reduce the weights of electrical machines. By testing Example 12B, we then logically seek to significantly reduce the onboard weight, in order to observe the consequences on the inrush and the noise compared to the G.O. Fe3% Si solution of Example 12. By bringing the work induction to 2 T, while maintaining a low residual induction (0.2 T) by using air gap shims and a series arrangement, it is possible to considerably reduce the weight of the magnetic core to 8 kg, which is the lowest weight of all the examples and counterexamples of these experiments. On the other hand, the noise magnetostriction increases just as considerably, and passes above 100 dB. Traditional FeCo alloys are, indeed, known for their strong true magnetostriction coefficients $\lambda_{100}$ and $\lambda_{111}$, as well as for their strong apparent magnetostriction coefficients. The inrush coefficient also increases significantly to values much too high for the transformer, which is the result of the work induction $B_t$ being very close to the saturation magnetization (according to the formula of the inrush).

It can therefore be seen from these two examples 12 and 12B that the use of high saturation magnetization materials with high By work induction values, and even with a calibrated air gap, does not make it possible to reach the desired inrush and noise level. A very strong reduction in B would make it possible, but at the cost of a significant increase in the onboard weight, which would not be admissible. These Examples 12 and 12B therefore fail to solve the exposed problem for aircraft transformers.

Examples 13 to 18 make it possible to evaluate the advantages of one of the elements of the invention, namely the use of an austenitic Fe—Ni alloy typically at 50% by weight of Ni, with high saturation and with a cubic texture {100} <001>. In these examples, it is used alone to achieve the magnetic circuit, i.e. without a contiguous high Js material structure.

Examples 13 (eight-shaped core) and 14 (double-E core) are not examples according to the invention, since the material under consideration (Fe-50% Ni) has, in their case, no marked texture. In fact, it is found that the noise emitted remains relatively high (75 and 82 dB), far from the optimal maximum value (55 dB) and not always in accordance with the maximum tolerable value (80 dB), for an average work induction $B_t$ of 1.1 T and a magnetic yoke weight of 12 kg. Example 13, whose noise level is 75 dB, could be acoustically acceptable for a transformer placed outside the cockpit, but its inrush index is too high (1.7). The opposite is true for example 14: the inrush index is good (0.655), but the noise is too high (82 dB). It cannot therefore be envisaged to make a transformer magnetic circuit meeting the specifications in all respects with such a material.

Example 14B has a configuration comparable to that of Example 14, but it requires a higher weight of non-textured Fe-50% Ni, and is used with a lower $B_t$ work induction. These modifications lead to a core which begins to be excessively heavy, and which goes hand in hand with a significant decrease in the power by mass unit. Thus, although its noise and inrush performances are good under the specified test conditions, it does not constitute a satisfactory solution to the problems posed.

Examples 15, 16 and 18 according to the invention are made with a Fe50% Ni alloy textured {100} <001>, It is surprising to note that, at the same work induction St the introduction of such a texture makes it possible to significantly reduce the noise emitted. At 15° of average disorientation w of the texture, the noise has already significantly decreased to go down to 62 dB, and so it becomes acceptable in some uses, while for disorientations three times lower, the noise emitted becomes remarkably less than or equal to the optimum upper limit of 55 dB. This average disorientation ω of the texture can be tolerable up to 20°, according to the invention.

Moreover, the inrush effect may be reduced, by a cut E, to acceptable levels (index<0.8) in Examples 15 and 16, while cutting an eight without an air gap ε (reference example 17) excessively degrades the inrush effect. This last example shows that the total absence of an air gap in the cutting plane of the profiled transformer pieces, does not allow to obtain a sufficient damping of the inrush effect, because of the excessive magnetic remanence $B_r$ of the magnetic circuit, despite the use of FeNi50 with a cubic texture and a low disorientation (7°).

It will be noted that Example 16 has characteristics in accordance with the requirements of the invention, although it only has a residual air gap s between its E's.

If we take advantage of these results to keep the favorable double-cut E with at least a residual air gap ε, and we limit the work induction a little more to further lower the inrush index, we get a textured Fe50% Ni mono-alloy solution that is satisfactory in terms of noise, inrush and reduced weight of the magnetic circuit (in Example 18 it is 13.1 kg), it has thus surprisingly been found that an FeNi alloy with 30-80% Ni, optimally 40-60% Ni, with a sufficiently acute cubic texture, although having significant coefficients of true magnetostriction $\lambda_{100}$ and $\lambda_{111}$, could significantly reduce the noise emitted by a transformer whose magnetic circuit is made by cutting and superposition of the E or eight-shaped plates. In addition it is observed that eight-shaped circuits devoid of an at least residual air gap do not allow, unlike E, I, C, circuits, sufficient damping of the inrush effect. They are therefore excluded from the scope of the invention.

The inventors also wanted to specify how the air gaps make it possible to reduce the remanent induction of a magnetic circuit, even though the material constituting it inherently has a high remanent induction due to its cubic texture {100} <001>.

The inventors hereinafter show in Table 5 specific examples which derive from Example 18bis of Table 4, an example which is according to the invention (and whose characteristics are repeated at the head of Table 5), in that they use plates of cubic FeNi50 ω=7°, arranged in E+I and do not include high Js material. These new examples are based on the two types of "series" and "∥" configurations previously presented with different variants, always using one E+one I at each level of a stack. The air gaps ε between E and I facing each other (i.e. along the longitudinal axis of the E branches), $\delta_1$ between two successive E or two I of the same stack, and $\delta_2$ between two successive stacks of E+I, are specified. When they are not residual, they are obtained using ε, $\delta_1$ or $\delta_2$ thick shims.

For all tests, Js is 1.6 T since it is the only material used to compose the core. The power is of the order of 46 kVA, FIG. 10 shows an example of a mixed configuration of the type of that of Examples 14 to 17. In such a mixed configuration, stacks are encountered whose plates comprising them are each arranged in series, but two successive stacks are arranged in parallel, n other words, upside down. "Res." means that the gap ε or $\delta_1$ concerned is residual "-" with respect to $\delta_2$ means that this air gap does not exist in the configuration concerned, since it is not a "mixed" configuration.

TABLE 5

Influence of air gaps on the remanent induction of the magnetic circuit

| Ex. | Configuration of the E + I | εp1 (mm) | ε (μm) | δ1 (μm) | δ2 (μm) | Config | Bt (T) | Br (T) | Noise (dB) | Inrush | Magnetic material thickness (mm) | Weight (kg) | Power weight (kVA/kg) | Weight brought back to a transformer 46 kvA (kg) |
|---|---|---|---|---|---|---|---|---|---|---|---|---|---|---|
| 18bis Inv | 353 E stacked + 353 I stacked | 79.50 | 200 | Res. | — | series | 1.00 | 0.050 | 43.5 | 0.450 | 79.50 | 13.10 | 3.49 | 13.1 |
| 18bis 2 | 5 E stacked + 5 I stacked | 1.00 | Res. | Res. | — | series | 1.01 | 0.190 | 44 | 0.603 | 1.00 | 0.16 | 3.51 | 13.1 |
| 18bis 3 | 10 E stacked + 10 I stacked | 2.05 | Res. | Res. | — | series | 1.00 | 0.185 | 44 | 0.585 | 2.00 | 0.33 | 3.49 | 13.1 |
| 18bis 4 | 15 E stacked + 15 I stacked | 3.08 | Res. | Res. | — | series | 1.00 | 0.175 | 43.5 | 0.575 | 3.00 | 0.49 | 3.49 | 13.1 |
| 18bis 5 | 15 E stacked + 5 I stacked + shim 83 μm between E and I | 1.00 | 83 | Res. | — | series | 0.99 | 0.123 | 44.5 | 0.510 | 1.00 | 0.16 | 3.47 | 13.2 |
| 18bis 6 | 10 E stacked + 10 I stacked + shim 83 μm between E and I | 2.05 | 83 | Res. | — | series | 0.99 | 0.028 | 43 | 0.401 | 2.00 | 0.33 | 3.44 | 13.3 |
| 18bis 7 | 5 E stacked + 5 I stacked + shim 190 μm between E and I | 1.00 | 190 | Res. | — | series | 0.97 | 0.031 | 44 | 0.377 | 1.00 | 0.16 | 3.40 | 13.5 |
| 18bis 8 | 10 E stacked + 10 I stacked + shim 190 μm between E and I | 2.05 | 190 | Res. | — | series | 0.98 | 0.029 | 44 | 0.389 | 2.00 | 0.33 | 3.42 | 13.4 |
| 18bis 9 | 5 E stacked + 5 I stacked + shim 83 μm between layers | 1.35 | Res. | 83 | — | series | 0.86 | 0.106 | 41 | 0.225 | 1.00 | 0.16 | 3.00 | 15.3 |
| 18bis 10 | 5 E et 5 I alternating | 1.00 | Res. | Res. | — | // | 1.01 | 0.823 | 45 | 1.236 | 1.00 | 0.16 | 3.51 | 13.1 |
| 18bis 11 | 10 E and 10 I alternating | 2.05 | Res. | Res. | — | // | 0.99 | 0.861 | 44 | 1.234 | 2.00 | 0.33 | 3.44 | 13.3 |
| 18bis 12 | 10 E et 10 I alternating + shims 83 μm between layers | 2.80 | Res. | 83 | — | // | 0.79 | 0.620 | 40 | 0.605 | 2.00 | 0.33 | 2.77 | 16.6 |
| 18bis 13 | 5 E et 5 I alternating + shim 83 μm between E and I | 1.35 | 83 | Res. | — | // | 1.00 | 0.602 | 43.5 | 1.002 | 1.00 | 0.16 | 3.49 | 13.1 |
| 18bis 14 | 3 × (3 E stacked + 3 I stacked), alternating + shims 83 μm between stacks | 1.97 | Res. | Res. | 83 | mixed | 0.98 | 0.567 | 43 | 0.927 | 1.80 | 0.30 | 3.42 | 13.4 |
| 18bis 15 | 3 × (3 E stacked + 3 I stacked), alternating + shims 166 μm between stacks | 2.15 | Res. | Res. | 166 | mixed | 0.90 | 0.490 | 42 | 0.687 | 1.80 | 0.30 | 3.14 | 14.6 |
| 18bis 16 | 3 × (5 E stacked + 5 I stacked), alternatings + shims 166 μm between stacks | 3.35 | Res. | Res. | 166 | mixed | 0.95 | 0.552 | 43 | 0.847 | 3.00 | 0.49 | 3.31 | 13.9 |

TABLE 5-continued

Influence of air gaps on the remanent induction of the magnetic circuit

| Ex. | Configuration of the E + I | εp1 (mm) | ε (μm) | δ1 (μm) | δ2 (μm) | Config | Bt (T) | Br (T) | Noise (dB) | Inrush | Magnetic material thickness (mm) | Weight (kg) | Power weight (kVA/kg) | Weight brought back to a transformer 46 kvA (kg) |
|---|---|---|---|---|---|---|---|---|---|---|---|---|---|---|
| 18bis 17 | 3 × (5 E stacked + 5 I stacked), alternating + shims 166 μm between stacks and shims 83 μm between E and I | 3.35 | 83 | Res | 166 | mixed | 0.86 | 0.433 | 41 | 0.562 | 3.00 | 0.49 | 3.02 | 15.2 |
| 18bis 17b | 3 × (5 E stacked + 5 I stacked), alternating + shims 166 μm between stacks and shims 83 μm between E and I | 3.35 | 83 | Res | 166 | mixed | 0.98 | 0.433 | 41 | 0.79 | 3.00 | 0.49 | 3.42 | 13.4 |
| 18bis 18 | 5 E + 5 I alternating | 1.00 | Res. | Res. | — | // | 0.79 | 0.823 | 38 | 0.796 | 1.00 | 0.16 | 2.75 | 16.7 |
| 18bis 19 | 10 E + 10 I alternating | 2.05 | Res. | Res. | — | // | 0.77 | 0.861 | 39 | 0.794 | 2.00 | 0.33 | 2.68 | 17.1 |

Thus, the material of Example 18a was tested in the same configuration as that which made it possible to obtain the results of Table 4, so with a single stack of 353 E-plates facing a single stack of 353 I plates, but with only a residual air gap ε between the E and I. In the "series" configuration of Examples 18bis 2, 5, 7, 9, this height of each stack of E and I is reduced to five superposed plates and makes it possible to obtain a very low value of remanent induction $B_r$, close to 0.2 T or even less. The configurations of the other examples of the "series" type also 18bis 3, 6, 8 and 18bis 4, only varying in the number of layers (10 and 15 respectively), show results of $B_r$ that are very similar to those of the series configuration with five plates per stack: $B_r$ decreases as the number of plates increases, all things being equal.

In order to be able to compare the various solutions 18bis2 to 18bis19 with example 18bis from which they are derived, the magnetic weight of each solution and the power weight (in kVA/kg) are calculated from the work induction $B_t$, and then the weight of the transformer corresponding to the same power (46 kVA) as that of Example 18bis is calculated. It is evident that examples 18bis2, 18bis3 and 18bis4 have the same power densities and the same equivalent weight of magnetic yoke. The noise and the inrush index also remain unchanged or close.

In the 18bis5 to 8 series configurations, the size of the air gap ε between the E and I is varied by a shim of thickness 83 or 190 μm, for magnetic cores comprising stacks of five or ten superposed plates. This time, $B_r$ reaches low values (18bis5), or even very low values approaching 0 (18bis6 to 8). We thus see that the "series" mode is very effective in reducing $B_r$, in conjunction with a calibrated air gap between the stacks of E and the stacks of I. $B_r$ is lower when ε is large, and also when the number of layers is high. The noise remains low (40-45 dB) while the inrush index is further reduced by the effect of the weak or very weak $B_r$.

In the 18bis9 configuration, which is also a series configuration, the gap ε is residual between the stacks of E and the stacks of I, but this time it is the gap $δ_1$ between each E and each I which is no longer residual thanks to a non-magnetic shim of thickness 83 μm interposed between each plate of each stack. Here too, it is possible to obtain a very low remanent induction $B_r$, of the order of 0.1 T, thus two times less than with residual air gaps $δ_1$, with an equal number of plates. The decrease in overall permeability generated by this type of air gap, however, reduces the work induction $B_t$ and therefore increases the magnetic core weight required for the transfer of electrical power: about 15 kg, that is 2 kg more, but, on the other hand, this gives a mechanical cohesion to the magnetic core by nonmagnetic air gap shims connecting the E and I of the same layer, which is sought by industrial construction technologies. Thus the magnetic core, presented as a stack of N (5 in 18bis9, 10 in 18bis8) E plates facing a stack of N I plates, can find a large mechanical monobloc cohesion by using non-magnetic shims at each level of the stacks.

The disadvantage of the series configuration is that the magnetic circuit is in two distinct parts that must be held together to ensure the air gap that, according to the invention, must be present at each level of each stack (whether residual or calibrated by shims), which transformer manufacturers are reluctant to do. They much prefer the "parallel" configuration because by alternating E with I in the superposition direction of the stack, we create strong mechanical cohesion of the magnetic core by the construction. It is this configuration which is studied in Examples 18bis10 to 13 and 18.19.

The configurations 18bis10 and 18bis11 are comparable to what is known to be used on onboard transformers in a "cut-ad-stack" mode, but are distinguished from the known configurations, regardless of the particular textured material used, by the presence of the air gap ε. This air gap s is residual both between layers and between the E and I of the same layer. The remanent induction $B_r$ is here raised (of the order of a little more than 0.8 T), which will degrade the inrush factor. That there are five or ten layers makes little difference to the results. But these examples 18bis10 and 18bis11, when used at a work induction $B_t$ of 1 T, emit, admittedly, low noise (45 and 44 dB), but also have an inrush index of the order of 1.2, which would be too high to conform to the invention.

However, it will be seen later (examples 18bis18 and 183bis19) that when $B_t$ is lowered a little, this configuration can give acceptable inrush results, and even lower noise, with the weight remaining reasonable, and that this configuration may therefore be considered as falling within the scope of the invention when it is coupled to the particular materials used, with their oriented textures as has been stated above. The introduction of a shim providing a $\delta_1$ of 83 μm between each level of the stack of E+I (configuration 18bis12) reduces $B_r$ by 0.2 T, which significantly improves the inrush. This approach could be continued by further increasing the thickness of the nonmagnetic shim: it is necessary to reach a shim thickness of approximately 300 μm between each layer so that $B_r$ reaches 0.2 to 0.3 T, a level close to that which is reached without air gaps $\delta_1$ with the "series" configuration. A possible problem is that adding a non-magnetic thickness of 300 μm for each magnetic plate thickness of the order of 200 μm in the example presented, amounts to increasing by 150% the volume of the transformer, even if the corresponding increase in weight can remain very small (if using plastic shims, for example). However, this solution may be used if the volume increase of the transformer remains acceptable. Example 18bis13 shows that introducing an air gap ε of 83 μm instead of an air gap $\delta_1$ of 83 μm while maintaining a work induction $B_t$ of 1 T does not allow one to have a sufficiently low inrush. It will be necessary, in this case, to reduce $B_t$, even if that increases the weight of the core by a little.

The inventors have discovered that a configuration of the "mixed" type of alternating stacks of plates which, taken in isolation, are arranged in "series" mode, but with two successive stacks of the same shapes and dimensions arranged relative to one another in "parallel" mode (i.e. with two successive stacks placed head-to-tail), as shown in FIG. 10, made it possible to have a good compromise between a reduced volume of the magnetic yoke and a low $B_r$. This is highlighted by the results obtained in configurations 18bis14 to 17 of Table 5. It also represents a good compromise for the cohesion of the whole. This cohesion is less strong than in the case of a configuration in parallel mode, but it is nevertheless sufficient so that a clamping device is not essential.

But one can even put air gap shims of $\delta_1$ thickness between the different plates of the same stack, resulting in a degradation of the power density (while the power density remains strong). In FIG. 10, a core 80 is thus seen comprising three superposed stack layers:
- a first layer 81 comprising a stack 82 of three I plates, each separated by shims 83 of thickness $\delta_1$, and a stack 84 of three E plates each separated by shims 85, also of thickness $\delta_1$, these two stacks 82, 84 facing each other and being separated by a shim 86 of thickness ε;
- a second layer 87 comprising a stack 88 of three I-plates separated by shims of thickness $\delta_1$ and a stack 89 of three E-leaves separated by shims also of thickness $\delta_1$, these two stacks 88, 89 facing each other and being separated by a shim 90 of thickness ε, the second layer 87 being arranged head-to-tail with respect to the first layer 81;
- a third layer 91 comprising a stack 92 of three I-plates separated by shims of thickness $\delta_1$ and a stack 93 of three E-plates separated by shims also of thickness $\delta_1$, these two stacks 92, 93 facing each other and being separated by a shim 94 of thickness ε, the third layer 91 being arranged head-to-tail with respect to the second layer 87 and thus being oriented in the same way as the first layer 81;
- air gap shims with a thickness $\delta_2$ (possibly different from $\delta_1$) between the different layers 81, 87, 91.

With regard to examples 18bis18 and 18bis19, we have already spoken about examples 18bis10 and 18bis11. They show that their configuration in E and I alternating with residual air gaps can give results that are at least acceptable from all points of view, on the one condition: that we work at a not too high induction $B_t$ (0.8 T), a little less than other more advantageous configurations. It is on this condition, and at the cost of a heavier transformer, that equal power remains, however, tolerable, and we get an inrush that is consistent with the specifications set in its least demanding variant.

It can be seen from the results presented in the various tables that all cases with a weight density of more than 4 kVA/kg (thus very interesting in terms of lightening the aircraft) have either a noise that is too high or an inrush that is much too strong. Therefore, all the interesting examples of the invention are, as may be seen, less than 4.5 kVA/kg for the work inductions $B_t$ considered (Example 22: 4.42 kVA/kg; an example that is considered as a reference example in Table 3 because of its too high inrush of 0.926 for a $B_t$ work induction of 1.39 T, but if $B_t$ (0.92 T) was decreased sufficiently, as for Example 18quater Inv of Table 4, one would come across a suitable inrush and a power density of 3.2 kVA/kg). It may be noted that the weight power obtained in Example 18quater Inv is the best (the highest) obtained for a "parallel" configuration (||, hence an alternation head-to-tail of the layers) of the transformer magnetic core and which, therefore, has its own mechanical cohesion without added weight. This performance is compared to the much better 4.15-4.2 kVA/kg of weight power which is the best performance obtained in the "series" configuration of the magnetic core. But it requires shims and especially a device for holding the free pieces of the magnetic core.

It may be considered that the examples of the invention are all potentially interesting from the moment when, in the case of this specific example of transformer requirements, it is between 3 and 4.5 kVA/kg of specific power. Note that depending on the noise and inrush transformer requirements, the preferred solutions may be different. It should also be noted that all the Examples 1 to 18 correspond to E+E structures (facing stacks) corresponding to FIG. 8, therefore without mechanical self-cohesion, and require the added weight of a rigid structure maintaining the two stacks precisely face-to-face, with a controlled air gap, resistant to magnetic forces. If we then restrict ourselves to the "parallel" or "mixed" structures not having this added weight, the best overall results are obtained with Example 18bis17b derived from 18bis17, at 3.42 kVA/kg, having its own mechanical cohesion due to its mixed configuration.

Examples 19 to 27 of Table 3 illustrate the effects of the introduction of a second high saturation magnetization Js material alongside the aforementioned cubic texture FeNi alloy. This second material is FeSi N.O. with 3% Si or FeCo with 27% Co. This introduction results in a reduction of the inrush effect, while the additional weight introduced by the presence of the second material is largely compensated by the possible re-increase of the work induction of the FeNi alloy (for example $B_t$=1.1 T instead of 1 T) since the inrush effect is no longer so high. It is again seen that the simple eight-shaped cut, without an air gap ε, increases the inrush effect unsatisfactorily (see the comparison between Examples 28 and 27). We also see that solutions using two complementary materials, accessible and satisfactory in noise and inrush, give access to magnetic yoke weights that are of the same order as the examples comprising a FeNi alloy alone, i.e. 12.7 to 14.5 kg, and are therefore sufficiently reduced to comply with the set specifications.

In all the examples described in Table 3 which make use of two materials, one with low magnetostriction and the other with high saturation magnetization Js, these two materials are arranged in successive stacks in "series" mode. However, it is not obligatory to group the plates of the two materials into two homogeneous entities that are quite distinct from one another. It is conceivable to put single plates or stacks of plates of high Js material between stacks of plates of low magnetostriction material, it may even be envisaged that the plate or the stack of high Js material may have a shape different from that of adjacent stack(s) of low magnetostrictive material plates, to form a "parallel" or "mixed" type core configuration, in which the differences in shape of the elements would go hand in hand with differences in the nature of the material One could thus combine the advantages of low residual induction, low noise, good mechanical cohesion and low weight related to different variants of the invention.

In general, the $B_r$ values of the configurations of Table 5 are low or very low, despite the rectangularity of the hysteresis cycle of the material without an air gap. This low residual induction leads, for the best configurations, to a low inrush index, regardless of the applied field.

Measurements of B (80 A/m) are very comparable for all these tests, and show that in all cases, for this type of relatively low applied field, one is close to saturation.

It is clear from FIG. 9 that a magnetic circuit structure of the cut-and-stack type comprising localized air gaps and constituting a magnetic core (alone or associated with a high Js alloy) based on textured FeNi alloy with a "cubic" texture {100} <001> surprisingly leads both to a respect of the desired limitations in noise and inrush effect and to a reduced weight of the magnetic circuit. It is noted that in aircraft, the admissible noise limits, or even inrush limits, change from one transformer to another depending on the aircraft, the exact function of the transformer in the aircraft, its place in the aircraft, etc. Permissible limits for the inrush index (0.8) and noise (80 dB, or better, 55 dB) have been set, which represent objectives whose conditions of satisfaction make it possible to highlight the advantages of the configurations according to the invention, coupled to a relatively low core weight for a given power.

This effect is surprising in that it shows that, under particular conditions of use, a FeNi alloy with high values of true magnetostriction may nevertheless be used alone (or possibly accompanied in the minority by a high-grade material such as FeCo or FeSi) to obtain a low noise magnetic circuit.

It is also surprising because, in view of the choice proposed in the prior art between, on the one hand, 42 kg of magnetic circuit FeCo or FeSi with low noise and low inrush, and, on the other hand, 6-8 kg of magnetic circuit in FeCo whose noise and inrush index are not admissible, it was difficult to guess that a solution exclusively or mainly based on FeNi could satisfy both the requirements of noise and inrush with a magnetic core whose weight would be only of the order of 10 to 17 kg or less. It was even all the more difficult to guess since the use of a conventional FeNi50 (not having a marked and particular texture) does not lead to the combined reductions sought for inrush, noise and weight.

The case has been described where only one of the used materials has a cubic texture. However, it is also possible to use simultaneously several materials with a cubic texture, for example different austenitic FeNi alloys satisfying the composition conditions specified above, provided that they represent, taken together, a majority volume proportion of the magnetic core. These different materials may, at the choice of the manufacturer, be arranged in each E, C or I core portion in the form of stacks of defined thicknesses of elements of the same composition, or mixed randomly within the portion. What is needed is that the pieces of the core at the same level of the stack facing each other and being separated by a residual or calibrated air gap ε, have the same arrangement in terms of choice of the material(s), i.e. that a cut plate, constituting a level of a stack of a given material is always in front of a cut part of the same material, constituting the corresponding level of the other stack (irrespective of the form of the plate constituting the corresponding level of the other stack, which may be the same or different from that of the plate at the same level of the first stack mentioned).

In the same vein, it is also possible to use layering solutions of the intermediate cut parts between the stacks of E or I or C and the overlays between each successive layer (E+E, E+I or C+I or C+C . . . ). In fact, it is possible, for example, to assemble stacks of small thickness (typically a few mm), typically each comprising one, a few or more (up to several tens) of cut pieces in the form of E or I or C, and then superpose these thin stacks. For configurations E+E and C+C, a head-to-tail overlap obviously makes sense only if the E or C of the same layer have branches of different lengths, otherwise we would fall back on a single configuration in E+E or C+C. This has the advantage of making it more convenient to provide a calibrated gap between two successive layers of stacks (for example 500 μm of gap width for 1 or 2 mm stacking height) while keeping the advantage of a good mechanical cohesion of the magnetic core thanks to the overlap. This arrangement has previously been described under the name "mixed" configuration by various examples of Table 5 and as shown in FIG. 10. In this case, it is moreover very preferable to ensure an interplanar gap calibrated by a non-magnetic layer disposed between each thin layer of the stacks, otherwise the magnetic flux bypasses the air gap between the E and I through the layers above and below, which significantly reduces the efficiency of the air gap compared to a residual air gap that would result from the simple superposition of the packets. This interplanar air gap is typically of a few tens to a few hundred μm (see previous examples).

It can be seen from Table 5 that some examples of parallel or mixed configurations have a slightly higher inrush index than the tested work inductions $B_t$ of the order of 1 T. However, it would suffice to obtain suitable results with the configurations of corresponding cores, to work at slightly lower inductions $B_t$, of the order of, for example, 0.8 T as was the case in several examples of Table 5, in order to obtain inrush indices less than 0.8 while requiring only a tolerable increase of the core of a few kg.

In fact as stated above, if we stick to weight power densities and if we eliminate all cases not respecting the inrush and noise, if moreover we consider that the added weight of the "series" examples (E+E examples 1 to 18) degrade their power density by making them less interesting than other configurations, then we notice that the mixed structures are the most interesting in power density (the maximum of the examples is at 3.42 kVA/kg).

Figure 11:
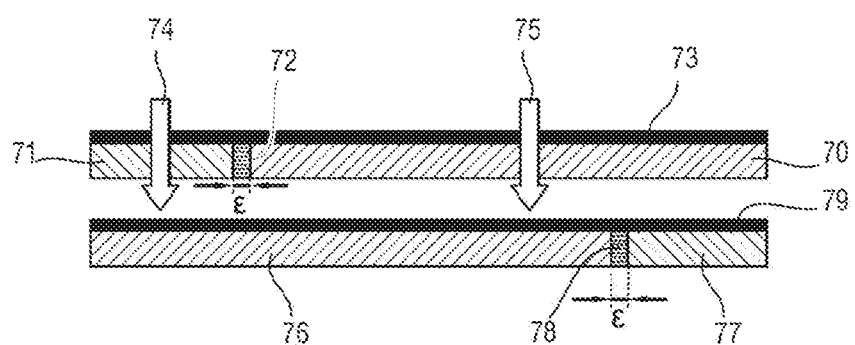
FIG. 11 shows in profile a variant of the core configuration having an interplanar gap calibrated by a nonmagnetic layer disposed between each layer of superposed thin layers, in a configuration where the two layers of stacks shown are arranged head to tail.

FIG. 11 shows such a configuration. There can be seen in cross-section a first stack 70 of cut E-plates, contiguous to a first stack 71 of cut I-plates, these two stacks 70, 71 being separated by an air gap formed by means of a non-magnetic insulating material 72 of thickness ε. The assembly thus formed is covered, on its upper face, with a nonmagnetic insulator 73, This assembly, as indicated by the arrows 74, 75, is placed, during the assembly of the core, on a second similar assembly comprising a second bundle of cut E-plates 76, attached to a second bundle of cut I-plates 77, these two bundles 76, 77 being separated by an air gap s made by means of a non-magnetic insulating material 78, and the assembly being coated on its upper surface by a non-magnetic insulator 79. The two sets are arranged head-to-tail, i.e. that the first stack of E-plates 70 is superposed on the second stack of I-plates 77, and the first stack of I-plates 71 is superposed on the second stack of E-plates 76. The insulator 79 of the second stack ensures the calibration of the air gap separating the two sets, and the thickness designated by $\delta_2$ in FIG. 10 in the foregoing description.

The case where a single second high Js material was used to form the complement of the transformer core according to the invention together with the alloy(s) FeNi 30-80% with cubic texture was described. But it would be conceivable to use several such high Js materials, for example a Fe-3% Si Goss-textured alloy and a Fe-50% Co alloy, in different respective proportions. The bottom line is that the 30-80% FeNi with a cubic texture remains the predominant material by volume in the core. As is the case for the majority portion of the core using cubic texture FeNi plates, the distribution of the various high Js materials in the complement may be carried out in the form of stacks of homogeneous composition or of stacks with randomly distributed composition, provided that the two pieces of the core are identical from the point of view of the composition of the plates facing each other at a given stack level.

The invention has been described and shown for the case of a three-phase transformer core "E+E" or "E+I". But it would also be applicable to the case of a single-phase transformer whose core would be shaped like "C+C" (FIGS. 5 and 6) or in the form of a square or rectangle, each side of which is formed by a different stack. The single-phase structure is also represented in Example 18ter Inv (Table 4), considering that, in this case, the minimum weight power applied to all the examples present does not apply to the single-phase structure that is well known to be much less effective in weight power than three-phase solutions.

The placing of an insulating coating on the faces of the cut pieces or the insertion of non-magnetic plates between the cut pieces makes it possible to better control the remanence of the magnetic circuit and the magnetising current of the transformer, it also increases the inrush performance, and makes the transformers more reproducible in industrial production.

The invention claimed is:

1. A cut-and-stack electrical transformer core, comprising two stacks or groups of stacks, each having a first thickness (ep1), the stacks each consisting of a single flat part or several identical flat parts isolated from each other, whose main cut directions are rectilinear and are either parallel or perpendicular to each other, the stacks or groups of stacks facing each other and having at least one residual or calibrated air gap (ε) with a maximum value of 10 mm between them, the flat parts being of at least one austenitic FeNi alloy containing Ni=30-80%, and at most 10% of alloying elements and impurities resulting from the preparation, the remainder being iron, the alloy having an acute cubic texture {100} <001>, of which at least 80% of the grains, deviate by an angle (ω) equal to at most 20° with respect to the ideal orientation {100} <001>, the two main cutting directions of the flat pieces being substantially parallel to either the rolling direction (DL) or the transverse direction (DT) perpendicular to the rolling direction (DL), the crystallographic plane (100) deviating at most 20° from the rolling plane, and the axes [001] or [010] and respectively the rolling direction (DL) or the transverse direction (DT) deviating from an angle (α) at most equal to 20°, the flat parts having magnetic losses in sinusoidal induction waves of the magnetic core, for a maximum induction of 1 T, less than 20 W/kg at 400 Hz, the apparent magnetostriction for a maximum induction of 1.2 T ($\lambda_s^{1.2\ T}$) being less than 5 ppm when the measurement is performed on an elongated rectangular sample, the field being applied in the direction of the long side of the sample and this direction being parallel to the lamination direction (DL), the apparent magnetostriction for a maximum induction of 1.2 T ($\lambda_s^{1.2\ T}$) being less than 5 ppm, when the measurement is made on an elongated rectangular sample, the field being applied in the direction of the long side of the sample and this direction being parallel to the transverse direction (DT) perpendicular to the rolling direction (DL) and located in the rolling plane, and the apparent magnetostriction for a maximum induction of 1.2 T ($\lambda_s^{1.2\ T}$) being less than 10 ppm when the measurement is made on an elongated rectangular sample, the field being applied in the long direction of the sample and this direction being parallel to the intermediate direction at 45° of the rolling direction (DL) and the transverse direction (DT).

2. The cut-and-stack electrical transformer core according to claim 1, wherein the stacks are each C-shaped, E-shaped or I-shaped.

3. The cut-and-stack electrical transformer core according to claim 2, wherein it is formed by a succession of layers of stacks, two successive layers being placed head-to-tail and separated by an air gap ($\delta_2$).

4. The cut-and-stack electrical transformer core according to claim 2, wherein it is formed by two E-shaped sub-cores facing each other.

5. The cut-and-stack electrical transformer core according to claim 2, wherein it is formed by a stack of E-shaped flat parts placed head-to-tail, the empty spaces between the lateral branches of the E-shaped flat parts being filled with I-shaped flat parts of the same composition and texture as those of the E-shaped flat parts, air gaps (ε) being present between the E-shaped flat parts and the I-shaped flat parts.

6. The cut-and-stack electrical transformer core according to claim 2, wherein it is formed by an E-shaped sub-core and an I-shaped sub-core facing each other.

7. The cut-and-stack electrical transformer core according to claim 2, wherein it is formed by two C-shaped sub-cores facing each other.

8. The cut-and-stack electrical transformer core according to claim 2, wherein it is formed by two contiguous sets of two C-shaped sub-cores facing each other.

9. The cut-and-stack electrical transformer core according to claim 1, wherein it is formed by a succession of layers of stacks, two successive layers being placed head-to-tail and separated by an air gap ($\delta_2$).

10. The cut-and-stack electrical transformer core according to claim 1, wherein at least one of the stacks consists of several flat parts of identical shape each separated by an air gap ($\delta_1$).

11. The cut-and-stack electrical transformer core according to claim 1, wherein the alloying elements are selected from the group consisting of Cr, Si, Al, Zr, Mo, W, V, Nb, Cu and Mn.

12. The cut-and-stack electrical transformer core according to claim 1, wherein the cut flat parts have a symmetry.

13. The cut-and-stack electrical transformer core according to claim 1, wherein the grain size of the parts is less than or equal to 200 μm.

14. The cut-and-stack electrical transformer core according to claim 1, wherein it also comprises second stacks of flat parts, having a second thickness (ep2), of the same shape as the stacks having a first thickness (ep1) and superposed thereon, the flat parts of the second stacks being in at least one material having a saturation magnetization (Js) greater than or equal to 2 T, the second stacks representing less than 50% of the volume of the core.

15. The cut-and-stack electrical transformer core according to claim 14, wherein the flat parts of the second stacks are made of at least one material selected from the group consisting of FeCo alloys, FeCo (V, Ta, Cr, Si, X) alloys with X selected from one or more Mo, Mn, Nb, Si, Al, of FeCoSi alloys, soft iron, steels, ferritic stainless steels containing 5-22% Cr and 0 to 10% total of Mo, Mn, Nb, Si, Al, V, and non-oriented FeSiAl electrical steels.

16. The cut-and-stack electrical transformer core according to claim 14, wherein the air gap ($\varepsilon$) between two stacks or groups of stacks facing each other has a different width between the first stacks having a first thickness (ep1) and between the second stacks having a second thickness (ep2).

17. The cut-and-stack electrical transformer core according to claim 16, wherein the air gap ($\varepsilon$) has a width ($\varepsilon_1$) between 2 and 1500 μm between the stacks having a first thickness (ep1) and a width ($\varepsilon_2$) between 2 and 3000 μm between the stacks having a second thickness (ep2).

18. A single-phase or a three-phase electrical transformer comprising a cut-and-stack magnetic core, wherein the magnetic core is the cut-and-stack electrical transformer core according to claim 1.

19. The transformer according to claim 18, wherein it is a transformer intended to be on board an aircraft.

20. The transformer according to claim 19, wherein it is a transformer intended to be placed in the cockpit of an aircraft.

* * * * *